(12) United States Patent
Kuromizu

(10) Patent No.: US 9,016,919 B2
(45) Date of Patent: Apr. 28, 2015

(54) LIGHTING DEVICE, DISPLAY DEVICE AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 454 days.

(21) Appl. No.: 13/512,031

(22) PCT Filed: Nov. 17, 2010

(86) PCT No.: PCT/JP2010/070433
§ 371 (c)(1),
(2), (4) Date: May 25, 2012

(87) PCT Pub. No.: WO2011/074365
PCT Pub. Date: Jun. 23, 2011

(65) Prior Publication Data
US 2012/0287348 A1    Nov. 15, 2012

(30) Foreign Application Priority Data

Dec. 17, 2009  (JP) ................................. 2009-286355

(51) Int. Cl.
*F21V 13/02*  (2006.01)
*F21V 8/00*  (2006.01)
*G02F 1/1333*  (2006.01)
*G02F 1/1335*  (2006.01)

(52) U.S. Cl.
CPC ............ *G02B 6/0043* (2013.01); *G02B 6/0031* (2013.01); *G02B 6/0061* (2013.01); *G02B 6/0088* (2013.01); *G02F 1/133308* (2013.01); *G02F 1/133615* (2013.01)

(58) Field of Classification Search
CPC .... G02B 6/0031; G02B 6/0043; G02B 6/061; G02B 6/0088; G02F 1/33308; G02F 1/133615

USPC ............ 362/609, 613, 619, 625, 634; 349/58, 349/65
See application file for complete search history.

(56) References Cited

U.S. PATENT DOCUMENTS

| 6,962,430 B2 * | 11/2005 | Ito et al. ........................ 362/634 |
| 8,267,566 B2 * | 9/2012 | Iwasaki ......................... 362/613 |
| 2003/0007343 A1 | 1/2003 | Ohwada et al. |

FOREIGN PATENT DOCUMENTS

| JP | 10-021720 A | 1/1998 |
| JP | 2002-116440 A | 4/2002 |

(Continued)

OTHER PUBLICATIONS

Official Communication issued in International Patent Application No. PCT/JP2010/070433, mailed on Feb. 22, 2011.

*Primary Examiner* — Stephen F Husar
(74) *Attorney, Agent, or Firm* — Keating & Bennett, LLP

(57) ABSTRACT

In order to improve brightness in a lighting device, a backlight unit 12 includes: LEDs 17 as a light source; a light guide member 19 having end portions LE facing the LEDs 17 and guiding light from the LEDs 17 to a light output side; a pressing member 16 configured to press the light guide member 19 from the light output side; and a pair of reflection sheets 21 and 22 disposed so as to sandwich the end portions LE of the light guide member 19 that face the LEDs 17. The pair of reflection sheets 21 and 22 includes the first reflection sheets 21 disposed on the light output side with respect to the light guide member 19, and the second reflection sheets 22 disposed on a side opposite to the light output side. The first reflection sheets 21 are fixed to the pressing member 16.

21 Claims, 13 Drawing Sheets

(56) References Cited

FOREIGN PATENT DOCUMENTS

| JP | 2003-022705 A | 1/2003 |
| JP | 2007-128748 A | 5/2007 |
| JP | 2009-026614 A | 2/2009 |
| JP | 2009-266636 A | 11/2009 |

* cited by examiner

LIGHTING DEVICE, DISPLAY DEVICE AND TELEVISION RECEIVER

TECHNICAL FIELD

The present invention relates to a lighting device, a display device and a television receiver.

BACKGROUND ART

In recent years, the display elements of image display devices, such as television receivers, have been in a period of transition from the conventional cathode-ray tubes to thin display panels, such as liquid crystal panels and plasma display panels, enabling a decrease in the thickness of the image display device. A liquid crystal display device includes a liquid crystal panel that does not emit light by itself. Therefore, the liquid crystal display device requires a backlight unit as a separate lighting device. The backlight unit may be categorized into a direct type and an edge-light type in terms of their mechanism. In order to realize a further decrease in the thickness of the liquid crystal display device, an edge-light type backlight unit may be preferable, such as one described in Patent Document 1 indicated below. The example described in Patent Document 1 includes a light source disposed so as to face a light incident surface on one side surface of a light guide plate. On a back surface of the light guide plate, a reflection sheet with an extending portion is attached. The extending portion is folded toward the front side while enclosing the light source, with a folded distal portion adhesively affixed to a front side surface of the light guide plate through an adhesive layer.

PATENT DOCUMENT

Patent Document 1: Japanese Unexamined Patent Publication No. 2002-116440

Problem to be Solved by the Invention

However, in the example disclosed in Patent Document 1, before light entering the light guide plate from the light source reaches the folded distal portion in the extending portion of the reflection sheet, the light passes through the adhesive layer. As a result, the light utilization efficiency may decrease due to absorption of the light by the adhesive layer. This may lead to a decrease in the amount of light that reaches a light output surface of the light guide plate, resulting in a decrease in brightness.

DISCLOSURE OF THE PRESENT INVENTION

The present invention has been made in view of the foregoing circumstances, and an object of the present invention is to increase brightness.

Means for Solving the Problem

A lighting device according to the present invention includes a light source; alight guide member having an end portion and provided such that the end portion faces the light and configured to guide light from the light source to a light output side; a pressing member configured to press the light guide member from the light output side; a pair of reflection members disposed so as to sandwich the end portion of the light guide member that faces the light source. The pair of reflection members includes a first reflection member disposed on the light output side with respect to the light guide member and a second reflection member disposed on a side opposite to the light output side with respect to the light guide member, and the first reflection member is fixed to the pressing member.

In this way, since the end portion of the light guide member on the light source side is sandwiched by the pair of reflection members, the light incident on the light guide member from the light source travels in the light guide member while being reflected between the first reflection member on the light output side and the second reflection member on the side opposite to the first reflection member. Since the first reflection member is disposed between the pressing member and the light guide member, the light in the light guide member can be more efficiently reflected compared to a configuration where the light guide member is pressed by the pressing member directly. Thus, the light utilization efficiency can be improved and high brightness can be obtained. In addition, since the first reflection member is fixed to the pressing member, the light can be directly reflected by the first reflection member. Accordingly, the light may not be absorbed by the adhesive layer. Thus, higher light utilization efficiency and brightness can be obtained compared to a configuration where the first reflection member is fixed to the light guide member through an adhesive layer or the like.

Preferred embodiments of the present invention may include the following.

(1) The first reflection member may be disposed in an entire area of a portion of the pressing member overlapping with the end portion of the light guide member on the light source side. In this way, the overlapping portion of the pressing member can be prevented from directly facing the end portion of the light guide member on the light source side. Thus, the light in the end portion can be prevented from hitting the overlapping portion and being absorbed thereby. Therefore, the light utilization efficiency can further be increased.

(2) The pair of reflection members may be disposed so as to sandwich the light source in addition to the end portion of the light guide member on the light source side. In this way, the light from the light source can be caused to be incident on the light guide member while being efficiently reflected by the pair of reflection members disposed so as to sandwich the light source in addition to the end portion of the light guide member on the light source side. Thus, the light utilization efficiency and brightness can further be increased.

(3) A plurality of the light sources may be arranged intermittently along the end portion of the light guide member that faces the light source. The pair of reflection members may extend along an arrangement direction of the light sources so as to collectively sandwich the plurality of light sources. In this way, since the pair of reflection members is also disposed between the adjacent light sources, the light existing between the adjacent light sources can also be efficiently reflected by the pair of reflection members and utilized as output light. Thus, still higher light utilization efficiency can be obtained. Further, compared to the configuration where the reflection members are disposed for each of the light sources individually, excellent workability in installing the pair of reflection members can be obtained.

(4) The lighting device may further include a chassis having an opening opened to the light output side and configured to house the light guide member and the light source. In this configuration, the second reflection member may be fixed to the chassis. In this way, since the second reflection member is fixed onto the chassis, the light can be directly reflected by the second reflection member. Accordingly, the light may not be absorbed by the adhesive layer or the like. Thus, higher light utilization efficiency and brightness can be obtained compared to the configuration where the second reflection member is fixed onto the light guide member through an adhesive layer or the like.

(5) The lighting device may further comprise a light scattering portion scattering light and disposed on at least one of a surface of the light guide member on the light output side and a surface of the light guide member on a side opposite to the light output side. In this way, the light in the light guide member can be scattered by the light scattering portion. Therefore, the output of the light from the light output side surface can be facilitated.

(6) The light guide member may include an end side portion close to the light source, and the end side portion corresponds to a light scattering portion non-formed area in which no light scattering portion is formed. The light guide member may include a middle portion other than the light scattering portion non-formed area, the middle portion corresponds to a light scattering portion formed area in which the light scattering portion is formed. The pair of reflection members may be disposed in an area ranging from the light scattering portion non-formed area to the light scattering portion formed area. In this way, since the pair of reflection members is disposed in the area straddling the light scattering portion non-formed area, in which the light scattering portion is not formed, and the light scattering portion formed area, in which the light scattering portion is formed, the light reflected by the pair of reflection members can be reliably caused to reach the light scattering portion formed area. Since the output of light is facilitated by the light scattering portion in the light scattering portion formed area, the light utilization efficiency can further be increased.

(7) The light scattering portion may have a light scattering degree increasing in a direction away from the light source. In portions of the light guide member relatively close to the light source, the amount of internal light is relatively large, whereas in portions relatively far from the light source, the amount of internal light is relatively small. On the other hand, the output of light is facilitated by increasing the light scattering degree in the light scattering portion, whereas the output of light is suppressed by lowering the light scattering degree. Thus, by varying the light scattering degree of the light scattering portion in proportion to the distance from the light source, the output of light can be suppressed in the portions of the light guide member where the amount of internal light is larger, while the output of light can be facilitated in the portions in which the amount of internal light is smaller. Accordingly, a uniform in-plane distribution of the output light from the light output side surface of the light guide member can be obtained.

(8) The pair of reflection members may be disposed with their end portions on a side opposite to the light source side aligned to be flush. In this way, the light can be more efficiently reflected between the pair of reflection members compared to the configuration where the end portions on the side opposite to the light source side are staggered.

(9) The pair of reflection members may have substantially a same surface light reflectance. In this way, the light utilization efficiency can further be increased.

(10) The pair of reflection members may be made of a same material. In this way, the manufacturing cost for the pair of reflection members can be reduced.

(11) The lighting device may further include a third reflection member disposed on at least a portion of the surface of the light guide member that is opposite to the light output side, and the at least the portion of the surface is an area except for the end portion on the light source side where the second reflection member is formed. In this way, the light in the light guide member can be reflected by the third reflection member and thereby caused to be directed upward toward the light output side. By providing the second reflection member and the third reflection member as separate components, the material for the individual reflection members may be appropriately selected.

(12) The second reflection member may have a higher surface light reflectance than the third reflection member. In this way, since the second reflection member is disposed closer to the light source than the third reflection member is, i.e., at a position where the amount of light is relatively high, the light utilization efficiency can further be increased by relatively increasing the surface light reflectance of the second reflection member. On the other hand, the third reflection member is disposed in a most part of the light guide member other than the end portion on the light source side. Thus, by relatively lowering the surface light reflectance of the third reflection member, the manufacturing cost for the third reflection member can be significantly reduced. Further, since the third reflection member is disposed farther from the light source than the second reflection member is, i.e., at a position where the amount of light is relatively small, the influence of relatively lowering the surface light reflectance of the third reflection member on the light utilization efficiency is minor.

(13) The second reflection member and the third reflection member may be disposed with their adjacent end surfaces abutted against each other. In this way, generation of a gap between the second reflection member and the third reflection member can be avoided. Therefore, light can be reflected by the second reflection member and the third reflection member without leakage and high light utilization efficiency can be obtained.

(14) The pressing member may have a light blocking property at least on a surface thereof. In this way, even if there is leakage of light from the light source side to the pressing member side due to the influence of dimensional tolerance, for example, leakage of light from the pressing member to the outside can be blocked by the pressing member.

(15) The pressing member may have a frame shape surrounding the end portion of the light guide member along an entire circumference thereof. In this way, leakage of light from the pressing member to the outside can be more reliably prevented.

(16) A pair of the light sources may be disposed such that each of the light sources is disposed at each end portion of the light guide member so as to face each other. In this way, the light from the pair of light sources can be caused to be incident on the both end portions of the light guide member. Therefore, a uniform in-plane distribution of the output light from the light output side surface of the light guide member can be obtained.

(17) The light source may be an LED. In this way, high brightness and low power consumption can be achieved.

(18) The lighting device may further include an LED board extending along the end portion of the light guide member. A plurality of LEDs may be disposed on the LED board along an extending direction of the LED board. In this way, excellent workability in installing the plurality of LEDs parallel to each other can be obtained.

In order to solve the problem, a display device according to the present invention includes the lighting device, and a display panel configured to display by utilizing the light from the lighting device.

According to the display device, since the lighting device that supplies light to the display panel has high brightness, a display with excellent display quality can be realized.

An example of the display panel is a liquid crystal panel. A display device like a liquid crystal display device can be applied for various purposes, such as displays for television sets or personal computers, particularly for large-size screens.

Advantageous Effect of the Invention

According to the present invention, brightness can be increased.

BEST MODE FOR CARRYING OUT THE INVENTION

<First Embodiment>

Figure 1:
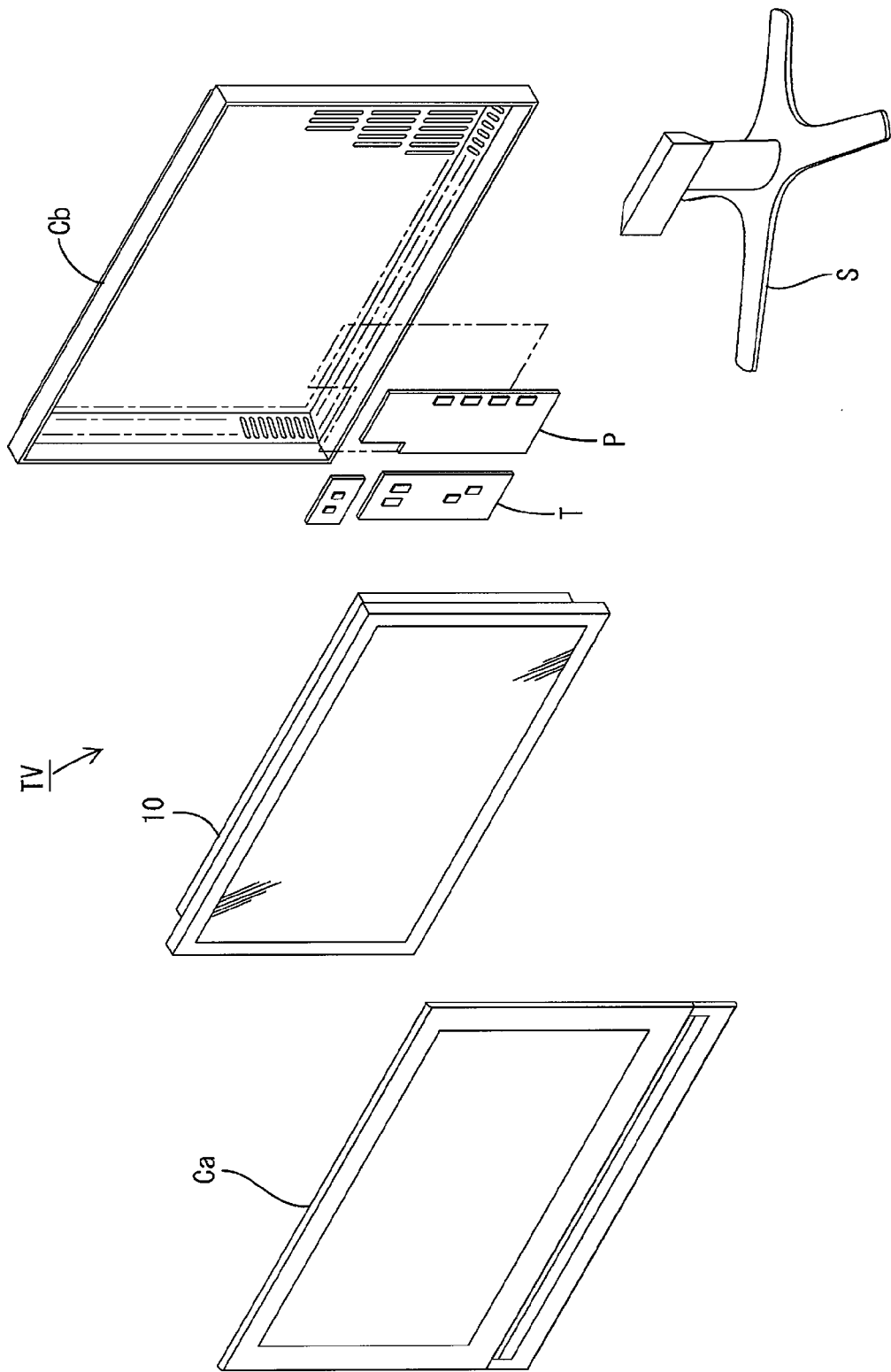
FIG. 1 is an exploded perspective view showing a schematic configuration of a television receiver according to a first embodiment of the present invention.

A first embodiment of the present invention will be described with reference to FIGS. 1 to 12. According to the present embodiment, a liquid crystal display device 10 will be described by way of example. In some parts of the drawings, an X-axis, a Y-axis, and a Z-axis are shown, and the directions of the axes corresponding to the directions shown in the drawings. An upper side and a lower side of FIGS. 3 and 4 correspond to a front side and a back side, respectively.

As shown in FIG. 1, a television receiver TV according to the present embodiment includes the liquid crystal display device 10; front and rear cabinets Ca and Cb housing the liquid crystal display device 10 in a sandwiching manner; a power source P; a tuner T; and a stand S. The liquid crystal display device (display device) 10 has a generally horizontally long (elongated) square (rectangular) shape, and is housed in an upright manner. The liquid crystal display device 10, as shown in FIG. 2, includes a liquid crystal panel 11 as a display panel, and a backlight unit (lighting device) 12 as an external light source, which are integrally held by a frame-like bezel 13, for example.

Figure 2:
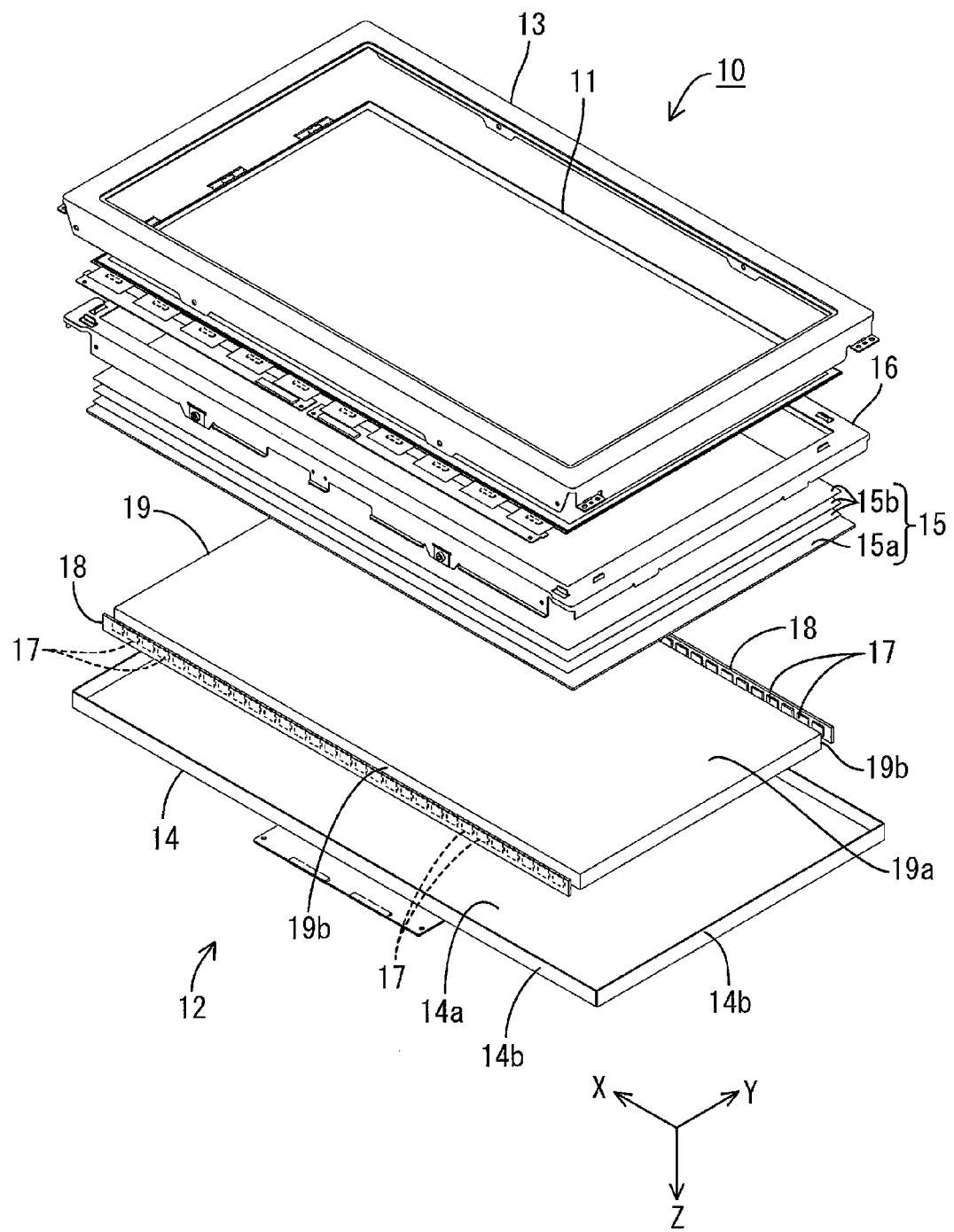
FIG. 2 is an exploded perspective view showing a schematic configuration of a liquid crystal display device of the television receiver.

As shown in FIG. 2, the liquid crystal panel 11 has a horizontally long (elongated) square (rectangular) shape in plan view, and includes a pair of glass substrates affixed to each other with a predetermined gap provided therebetween, with liquid crystal enclosed between the glass substrates. One of the glass substrates is provided with switching components (such as TFTs) connected to source wiring and gate wiring that are orthogonal to each other, pixel electrodes connected to the switching components, an alignment film, or the like. The other glass substrate is provided with color filters including color sections of, for example, R (red), G (green), and B (blue) that are disposed in predetermined arrangements, counter electrodes, an alignment film, or the like. On the outer sides of the substrates, polarizing plates are disposed.

As shown in FIG. 2, the backlight unit 12 includes a substantially box-shaped chassis 14 having an opening opened to a light output surface side (the side of the liquid crystal panel 11); and a group of optical members 15 (a diffuser plate (light diffusing member) 15a and a plurality of optical sheets 15b disposed between the diffuser plate 15a and the liquid crystal panel 11) disposed so as to cover the opening of the chassis 14. The chassis 14 houses LEDs 17 (Light Emitting Diodes) as a light source; LED boards 18 on which the LEDs 17 are mounted; a light guide member 19 guiding light from the LEDs 17 to the optical members 15 (liquid crystal panel 11); and a pressing member 16 pressing the light guide member 19 from the front side. In the backlight unit 12, the LED boards 18 having the LEDs 17 are disposed on both end portions of the backlight unit 12 on the long sides thereof, and the light guide member 19 is disposed on a central side sandwiched between the LED boards 18. Thus, the backlight unit 12 is of the so-called edge-light type (side-light type). In the following, the constituent components of the backlight unit 12 will be described in detail.

Figure 3:
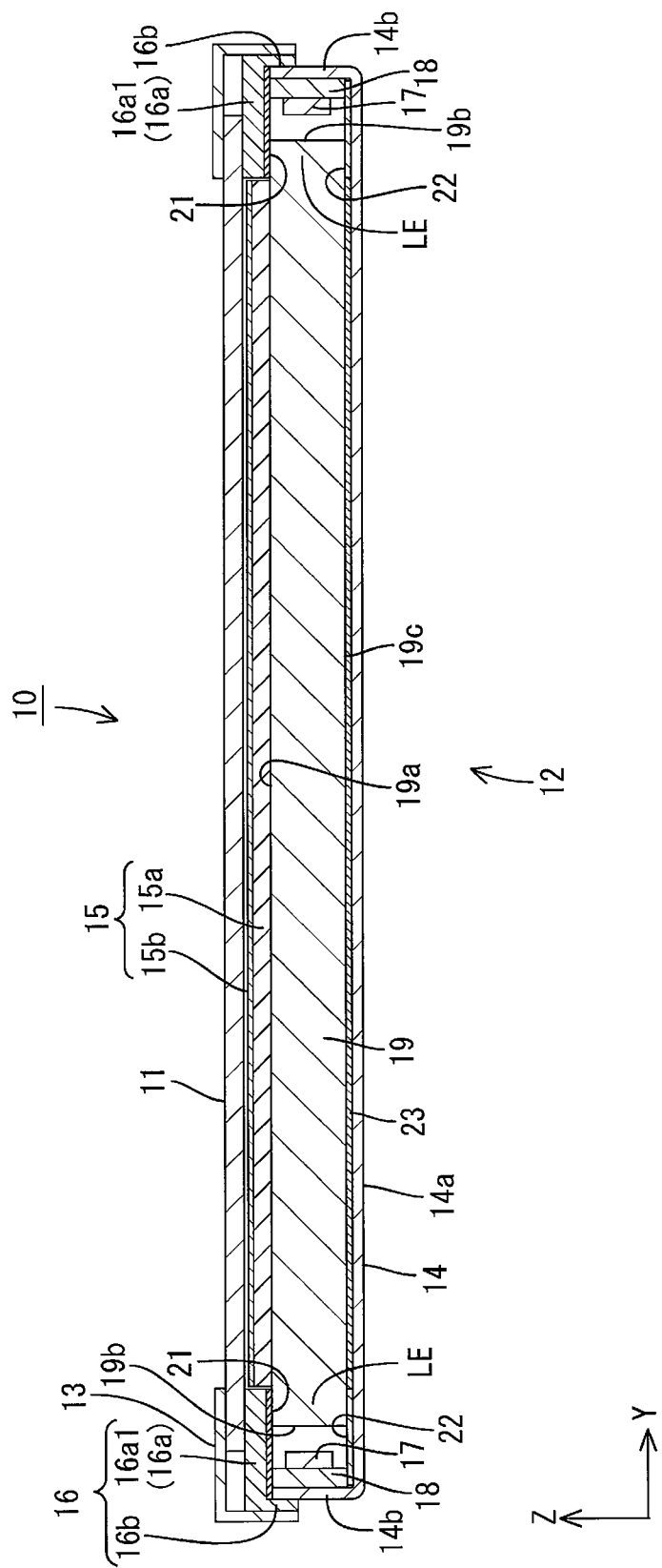
FIG. 3 is a cross section view of the liquid crystal display device taken along a short side direction thereof.
Figure 4:
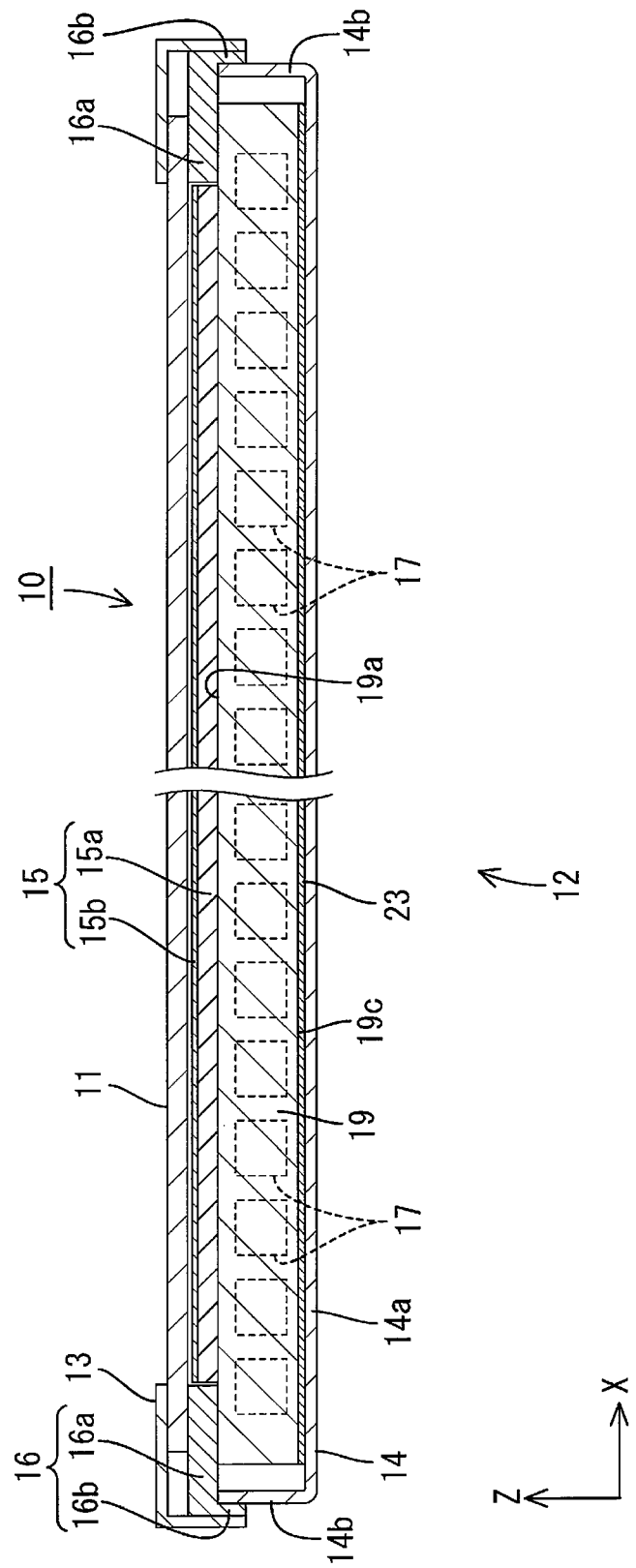
FIG. 4 is a cross section view of the liquid crystal display device taken along a long side direction thereof.

As shown in FIGS. 3 and 4, the chassis 14, which may be made of a metal, includes a bottom plate 14a having a horizontally long square shape similar to the liquid crystal panel 11, and side plates 14b rising from outer ends of the sides of the bottom plate 14a. Thus, the chassis 14 has a generally shallow, substantially box-like shape that is opened toward the front side. The chassis 14 (bottom plate 14a) has a long side direction aligned with the X-axis direction (horizontal direction) and a short side direction aligned with the Y-axis direction (vertical direction). The pressing member 16 and the bezel 13 may be attached to the side plates 14b by screws.

As shown in FIG. 2, the optical members 15 have a horizontally long square shape in plan view, similar to the liquid crystal panel 11 and the chassis 14. The optical members 15 are placed on the front side (light output side) of the light guide member 19 and are disposed between the liquid crystal panel 11 and the light guide member 19. The optical members 15 include the diffuser plate 15a disposed on the back side (the side of the light guide member 19; side opposite to the light output side), and the optical sheets 15b disposed on the front side (the side of the liquid crystal panel 11; the light output side). The diffuser plate 15a is made of a substantially transparent plate-like base substrate made of a resin with a predetermined thickness in which a number of diffusing particles are dispersed. The diffuser plate 15a has the function of diffusing transmitted light. The optical sheets 15b is formed of a stack of three layers of sheets each with a thickness smaller than the thickness of the diffuser plate 15a. Specific types of the optical sheets 15b may include a diffuser sheet, a lens sheet, and a reflection type polarizing sheet, from which one or more may be appropriately selected and used.

Figure 6:
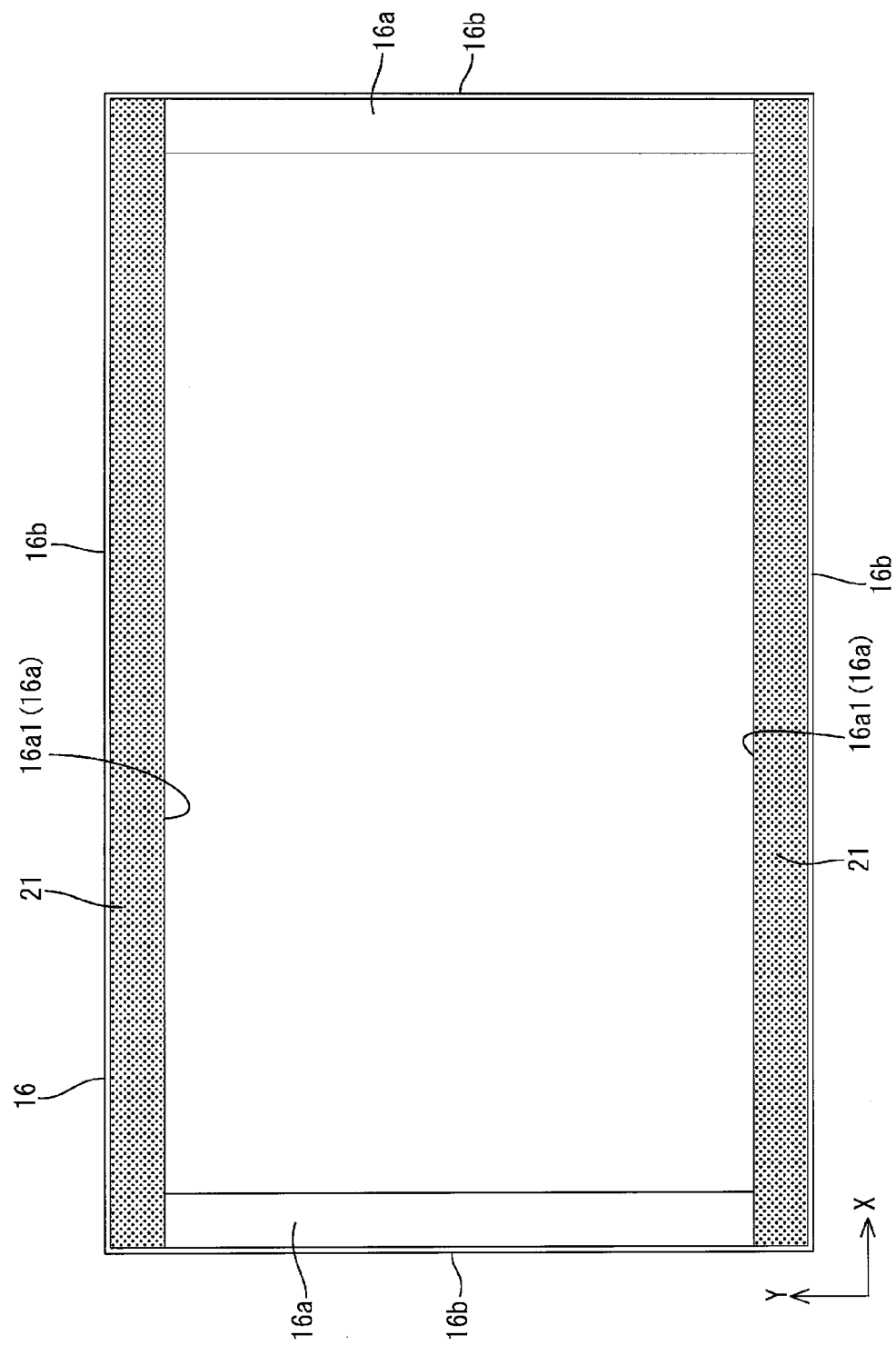
FIG. 6 is a bottom view of a pressing member including first reflection sheets.
Figure 7:
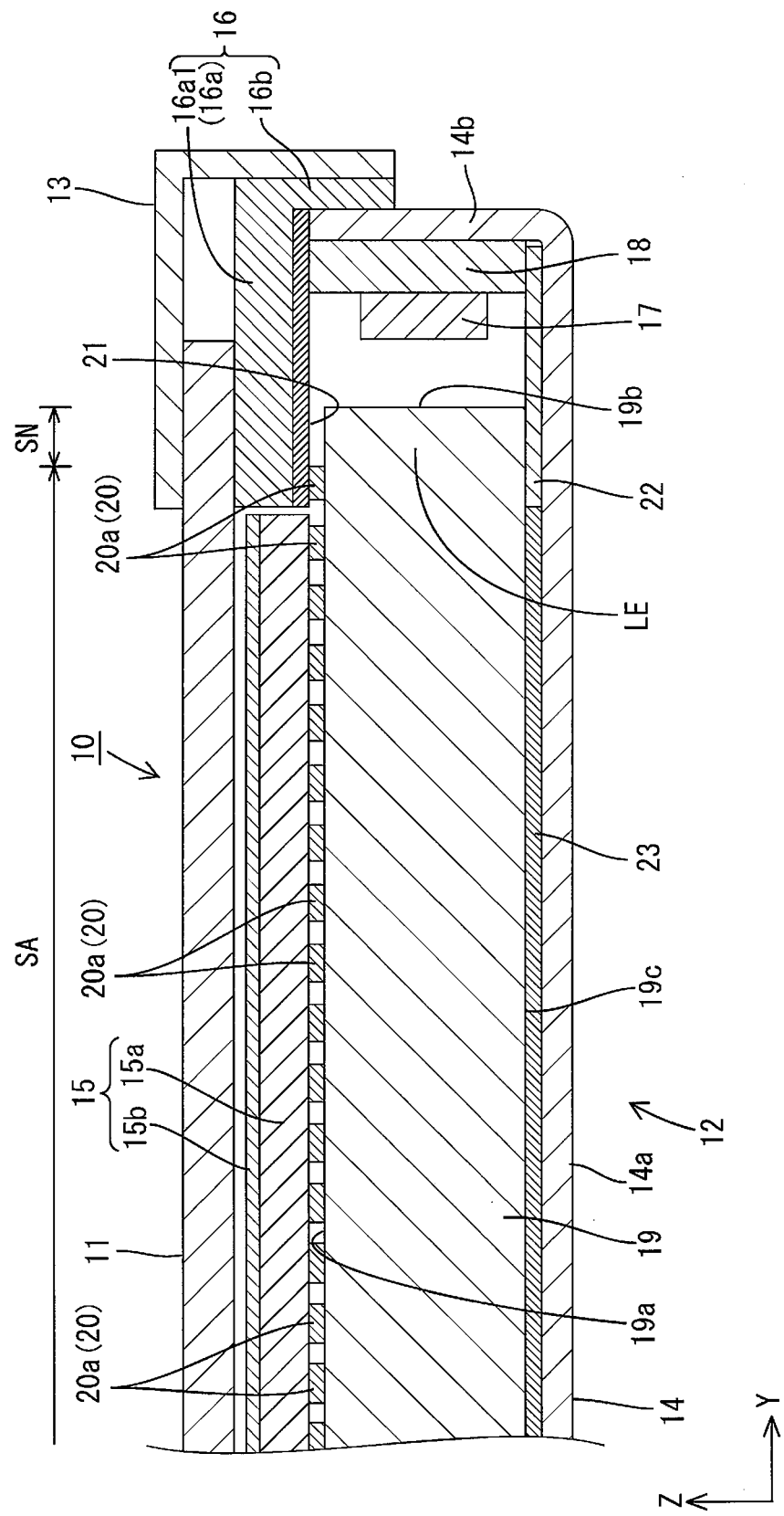
FIG. 7 is a cross section view of the liquid crystal display device taken along line vii-vii of FIG. 4.

As shown in FIGS. 2 and 6, the pressing member 16 has a frame shape (a picture frame shape) extending along outer peripheral end portions of the light guide member 19 (optical member) so as to press the substantially entire outer peripheral end portions of the light guide member 19 from the front side. The pressing member 16 may be made of a synthetic resin with a black surface for excellent light blocking property. As shown in FIGS. 3 and 4, the pressing member 16 has a substantially L-shaped cross section, and includes a base portion 16a parallel with main plate surfaces of the liquid crystal panel 11 and the light guide member 19 and disposed between the liquid crystal panel 11 and the light guide member 19 so as to press the light guide member 19. The pressing member 16 also includes side portions 16b parallel with the Z-axis direction and disposed between the side plates 14b of the chassis 14 and side portions of the bezel 13. The base portion 16a includes a pair of long side portions 16a1 overlapping with end portions LE of the light guide member 19 on the side of the LEDs 17 and with the LED boards 18 (including the LEDs 17). The long side portions 16a1 may be referred to as overlapping portions 16a1 (FIGS. 3 and 7). The base portion 16a of the pressing member 16 is configured to receive outer peripheral end portions of the liquid crystal panel 11 from the back side.

As shown in FIGS. 2 and 3, the LEDs 17 include LED chips which are sealed on board portions fixed on the LED boards 18 with a resin material. The LED chips mounted on the board portions may be configured to emit light of a single dominant emission wavelength, such as the single color of blue. The resin material with which the LED chips are sealed may include a dispersion of a phosphor that converts the blue light emitted from the LED chips into white light. Accordingly, the LEDs 17 can emit white light. The LEDs 17 are of the so-called "top-type" in which the light emitting surface is disposed on the side opposite to the mounting surface with respect to the LED boards 18.

As shown in FIGS. 2 and 3, the LED boards 18 have a long plate shape extending along the long side direction of the chassis 14 (the X-axis direction, along the end portions LE of the light guide member 19 on the side of the LEDs 17). The LED boards 18 are housed in the chassis 14 with their main plate surfaces parallel with the X-axis direction and the Z-axis direction; namely, orthogonal to the plate surfaces of the liquid crystal panel 11 and the light guide member 19 (optical members 15). A pair of the LED boards 18 is disposed at corresponding end portions within the chassis 14 on the long sides thereof, and is attached to inner surfaces of the side plates 14b of the chassis 14 on the long sides thereof. The LEDs 17 with the above-described configuration are surface-mounted on the inside of the main plate surfaces of the LED boards 18; namely, on the surface facing the light guide member 19. A plurality (30 pieces in the example of FIG. 2) of the LEDs 17 is disposed parallel to each other (linearly) on the mounting surface of the LED boards 18, along a length direction of the LED boards 18 (X-axis direction). Thus, it may be said that the plurality of the LEDs 17 is disposed parallel to each other at each of the both end portions of the backlight unit 12 on the long sides thereof along the long side direction. The pair of LED boards 18 is housed in the chassis 14 with the mounting surfaces of the LEDs 17 facing each other such that the light emitting surfaces of the LEDs 17 mounted on the LED boards 18 are facing each other, with the optical axis of the LEDs 17 substantially aligned with the Y-axis direction. In other words, the LEDs 17 surface-mounted on the pair of LED boards 18 are disposed so as to face the both end portions LE of the light guide member 19.

The base member of the LED boards 18 may be made of metal, the same material as that of the chassis 14, such as an aluminum material, with a wiring pattern (not shown) of a metal film, such as copper foil, formed on a surface of the base member through an insulating layer. The LEDs 17 disposed parallel to each other on the LED boards 18 are connected in series by the wiring pattern. The material of the base member of the LED boards 18 may include an insulating material, such as ceramics.

Next, the light guide member 19 will be described in detail. The light guide member 19 may include a substantially transparent (i.e., highly light transmissive) synthetic resin material (such as acrylic) with a refractive index sufficiently higher than air. As shown in FIGS. 2 to 4, the light guide member 19 has a horizontally long square shape in plan view similar to the liquid crystal panel 11 and the chassis 14, with a long side direction aligned with the X-axis direction and a short side direction aligned with the Y-axis direction. In the chassis 14, the light guide member 19 is disposed at a position immediately below the liquid crystal panel 11 and the optical members 15, and sandwiched between the pair of LED boards 18 disposed at the both end portions of the chassis 14 on the long sides thereof with respect to the Y-axis direction. Thus, the LEDs 17 (LED boards 18) and the light guide member 19 are arranged in an arrangement direction aligned with the Y-axis direction, whereas the optical members 15 (liquid crystal panel 11) and the light guide member 19 are arranged in an arrangement direction aligned with the Z-axis direction, the both arrangement directions being orthogonal to each other. The light guide member 19 has the function of introducing light emitted from the LEDs 17 in the Y-axis direction and causing the light to be directed up toward the optical members 15 (Z-axis direction) for output while allowing the light to travel therein. The light guide member 19 is formed to be slightly larger than the optical members 15, with the outer peripheral end portions thereof overhanging outward beyond the outer peripheral end surfaces of the optical members 15 and being pressed by the pressing member 16 (FIGS. 3 and 4).

The light guide member 19 has a substantially planar shape extending along the plate surfaces of the bottom plate 14a of the chassis 14 and the optical members 15, with main plate surfaces thereof parallel with the X-axis direction and the Y-axis direction. Of the main plate surfaces of the light guide member 19, the surface facing the front side constitutes a light output surface 19a that causes the internal light to be output toward the optical members 15 and the liquid crystal panel 11. Of the outer peripheral end surfaces of the light guide member 19 adjacent to the main plate surfaces, the both end surfaces on the long sides along the X-axis direction are facing the LEDs 17 (LED boards 18). Thus, the both end surfaces constitute light incident surfaces 19b on which the light from the LEDs 17 is incident. Specifically, the both end portions of the light guide member 19 on the long sides thereof (the end portions extending along the long side direction) are referred to as "end portions LE on the side of the LEDs 17". On the end portions LE, the light incident surfaces 19b are disposed on which the light from the LEDs 17 is incident. The light incident surfaces 19b are surfaces parallel with the X-axis direction and the Z-axis direction, and are substantially orthogonal to the light output surface 19a. The LEDs 17 and the light incident surfaces 19b are arranged in a direction aligned with the Y-axis direction and parallel to the light output surface 19a. A predetermined gap is provided between the light incident surfaces 19b and the LEDs 17 with respect to the Y-axis direction. Therefore, assembly error can be absorbed and interference between the light guide member 19 and the LEDs 17 can be prevented.

Figure 5:
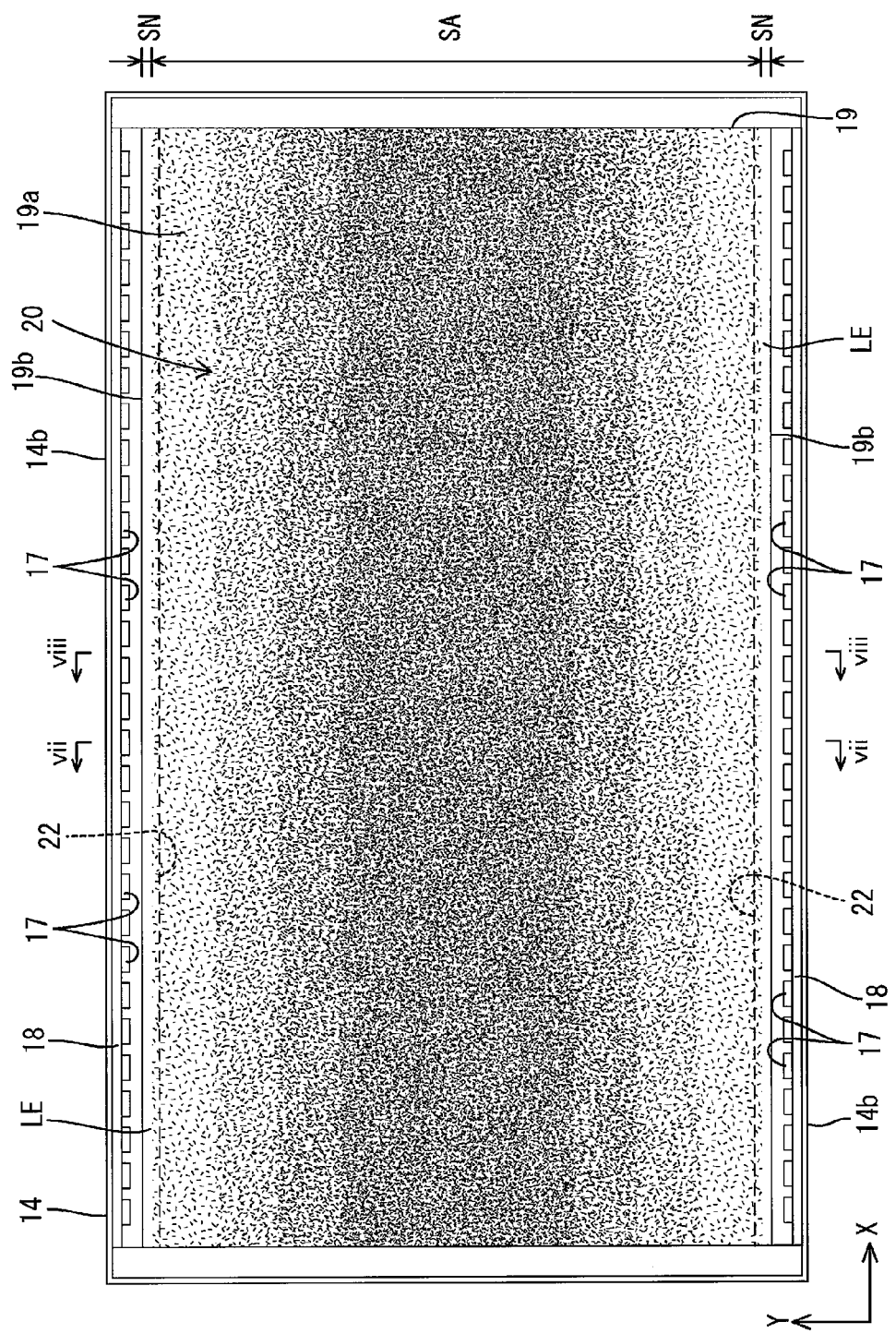
FIG. 5 is a plan view of a layout of LED boards, a light guide member, and second reflection sheets in a chassis of the liquid crystal display device.

As shown in FIGS. 5 and 7, a light scattering portion 20 scattering light is formed on the light output surface 19a of the light guide member 19 so as to facilitate the output of light. The light scattering portion 20 is formed only on a central side of the light output surface 19a and not formed on the outer peripheral end sides. That is, the light guide member 19 has a pair of light scattering portion non-formed areas SN on the both end sides in the short side direction, i.e., on the both end sides closer to the LEDs 17, where the light scattering portion 20 is not formed, and a light scattering portion non-formed area SA in the central side other than the light scattering portion non-formed areas SN, where the light scattering portion 20 is formed. The pair of the light scattering portion non-formed areas SN is disposed so as to sandwich the light scattering portion formed area SA from both sides with respect to the Y-axis direction, the areas SN and SA extending along the X-axis direction. The greater the degree of scattering of light by the light scattering portion 20, the more facilitated the output of light tends to be, while the smaller the degree of scattering of light, the more suppressed the output of light tends to be.

The light scattering portion 20 may be formed by printing light scattering particles of silica or titanium oxide on the light output surface 19a. The light scattering portion 20 includes a number of dots 20a with a dot pattern. By varying the dot pattern in the plane of the light output surface 19a, the degree of scattering of light by the light output surface 19a, i.e., the ease (or difficulty) of light output, can be varied. Since the degree of scattering of light is proportional to the size of the area of the dots 20a constituting the light scattering portion 20, the light scattering portion 20 is patterned such that the area of the dots 20a is varied in the plane of the light output surface 19a. Specifically, in the light scattering portion formed area SA of the light output surface 19a, the dots 20a of the light scattering portion 20 have a substantially uniform area with respect to the X-axis direction, which is orthogonal to the optical axis of the LEDs 17, whereas the area of the dots 20a is varied with respect to the Y-axis direction, which is aligned with the optical axis of the LEDs 17. Specifically, the area of the dots 20a of the light scattering portion 20 is increased from the both end sides of the light guide member 19 in the short side direction (Y-axis direction) toward the central side; namely, the area is increased with increasing distance from the LEDs 17 such that the area is maximum at the central position. Conversely, the area is decreased from the central side toward the both end sides in the short side direction; namely, the area is decreased with decreasing distance from the LEDs 17 such that the area is minimum at the both end positions of the light scattering portion formed area SA in the short side direction. It is noted that the amount of light present in the light guide member 19 tends to be larger in portions relatively close to the LEDs 17 as the supply source of light, and the amount of light tends to be smaller in portions relatively away from the LEDs 17. Thus, by distributing the degree of scattering of light in the light output surface 19a in proportion to the distance from the LEDs 17, the output of light can be suppressed in the portions with relatively large amounts of internal light, while the output of light can be facilitated in the portions with smaller amounts of internal light. Accordingly, a uniform in-plane distribution of output light can be achieved in the plane of the light output surface 19a.

As shown in FIG. 7, the backlight unit 12 according to the present embodiment includes the three types of reflection sheets 21 to 23 for efficiently causing light to be incident on the light guide member 19 and enabling the incident light to efficiently travel in the light guide member 19. The reflection sheets 21 to 23 include the first reflection sheets 21 and the second reflection sheets 22 disposed so as to sandwich the end portions LE of the light guide member 19 in the short side direction, i.e., on the side of the LEDs 17, with respect to the Z-axis direction. The reflection sheets 21 to 23 also include the third reflection sheet 23 disposed on a surface 19c, which is one of the main plate surfaces of the light guide member 19 on the back side thereof and opposite to the light output surface 19a. The reflection sheets 21 to 23 may be made of a synthetic resin with a white surface for high light reflecting property. Particularly, according to the present embodiment, the first reflection sheets 21 are fixed onto the pressing member 16 but not fixed onto the light guide member 19.

Specifically, as shown in FIG. 7, the first reflection sheets 21 are disposed between the light guide member 19 and the pressing member 16 while covering the end portions LE of the light guide member 19 on the side of the LEDs 17 from the front side. Front side surfaces of the first reflection sheets 21 (side facing the pressing member 16) are fixedly attached to back side surfaces of the base portion 16a of the pressing member 16 with an adhesive layer (not shown). On the other hand, back side surfaces of the first reflection sheets 21 (side facing the light guide member 19) are directly abutted on front side surfaces of the end portions LE of the light guide member 19 on the side of the LEDs 17, without an adhesive layer or the like. Thus, in the end portions LE of the light guide member 19 on the side of the LEDs 17, some of the incident light from the LEDs 17 traveling toward the front side directly hits the first reflection sheets 21 and is thereby reflected toward the back side. If an adhesive layer is provided between the light guide member 19 and the first reflection sheets 21, light would be absorbed by the adhesive layer. According to the present embodiment, there is no such absorption of light by the adhesive layer and therefore the loss of light is decreased by that amount. Thus, high light utilization efficiency can be obtained. The first reflection sheets 21 have a surface light reflectance sufficiently higher than a surface light reflectance of the pressing member 16.

As shown in FIGS. 6 and 7, the first reflection sheets 21 are selectively attached to the long side portions 16a1 of the base portion 16a of the pressing member 16 extending along the X-axis direction, namely the overlapping portions 16a1 for the end portions LE of the light guide member 19 on the side of the LEDs 17, the first reflection sheets 21 extending over substantially the entire areas of the overlapping portions 16a1. Since the overlapping portions 16a1 of the base portion 16a of the pressing member 16 are substantially entirely covered with the first reflection sheets 21, the overlapping portions 16a1 are prevented from directly facing the end portions LE of the light guide member 19 on the side of the LEDs 17. Therefore, the light from the end portions LE can be prevented from directly hitting the overlapping portions 16a1 and being absorbed thereby. In FIG. 6, the first reflection sheets 21 are indicated by hatching.

As shown in FIG. 7, the second reflection sheets 22 are disposed between the bottom plate 14a of the chassis 14 and the light guide member 19 so as to sandwich the end portions LE of the light guide member 19 on the side of the LEDs 17 with the first reflection sheets 21. Back side surfaces of the second reflection sheets 22 (side facing the bottom plate 14a) are fixedly attached to a front side surface of the bottom plate 14a through an adhesive layer (not shown). On the other hand, front side surfaces of the second reflection sheets 22 (side facing the light guide member 19) are directly abutted on the back side surface 19c of the light guide member 19 in the end portions LE thereof on the side of the LEDs 17 without an adhesive layer or the like. Thus, in the end portions LE of the light guide member 19 on the side of the LEDs 17, some of the incident light from the LEDs 17 traveling toward the back side directly hits the second reflection sheets 22 and is thereby reflected toward the back side. If an adhesive layer is disposed between the light guide member 19 and the second reflection sheets 22, light would be absorbed by the adhesive layer. In comparison, according to the present embodiment, there is no absorption of light by the adhesive layer, and therefore, the loss of light can be decreased by that amount. Thus, high light utilization efficiency can be obtained. As shown in FIG. 5, a pair of the second reflection sheets 22 is disposed at the end portions of the bottom plate 14a of the chassis 14 on the long sides thereof, extending along the X-axis direction. The second reflection sheets 22 have a surface light reflectance that is sufficiently higher than a surface light reflectance of the chassis 14.

Figure 8:
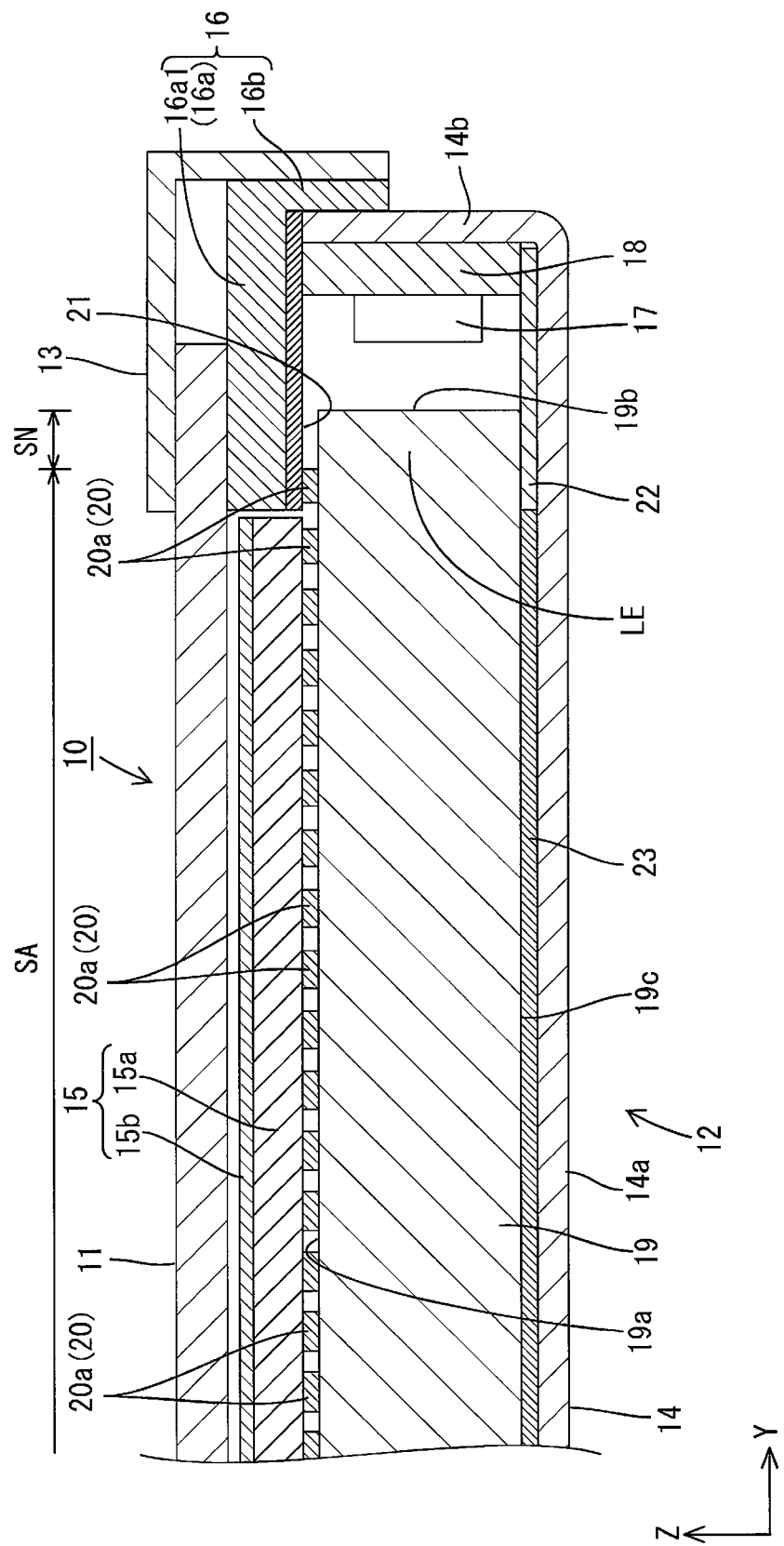
FIG. 8 is a cross section view of the liquid crystal display device taken along line viii-viii of FIG. 4.

Next, common or correlated structures of the first reflection sheets 21 and the second reflection sheets 22 will be described in detail. As shown in FIG. 7, the first reflection sheets 21 and the second reflection sheets 22 are disposed so as to sandwich not only the end portions LE of the light guide member 19 on the side of the LEDs 17 but also the LED boards including the LEDs 17. That is, the first reflection sheets 21 and the second reflection sheets 22 surround the space defined by the LEDs 17 and the light incident surfaces 19b of the light guide member 19, thereby optically enclosing the space. Thus, the light from the LEDs 17 can be reflected and made incident on the light incident surfaces 19b efficiently with almost none of the light leaking from the space to the outside. As shown in FIGS. 5 and 6, the first reflection sheets 21 and the second reflection sheets 22 extend along the X-axis direction, i.e., along the arrangement direction of the LEDs 17, so as to collectively sandwich the LEDs 17. Specifically, the first reflection sheets 21 and the second reflection sheets 22 are larger than the LED boards 18 in length dimension, thereby overlapping with the entire areas of the LED boards 18. Thus, the spaces defined by the portions of the LED boards 18 between the adjacent LEDs 17, i.e., the portions in which the LEDs 17 are not present, and the light incident surfaces 19b of the light guide member 19 are also surrounded by the first reflection sheets 21 and the second reflection sheets 22, as shown in FIG. 8. Accordingly, the light emitted from the LEDs 17 into the spaces between the adjacent LEDs 17 can also be efficiently caused to be incident on the light incident surfaces 19b with almost none of the light leaking outside. Thus, the spaces between the LED boards 18 and the light incident surfaces 19b are almost entirely surrounded by the first reflection sheets 21 and the second reflection sheets 22.

As shown in FIG. 7, the first reflection sheets 21 and the second reflection sheets 22 are disposed in areas straddling the light scattering portion non-formed area SA and the light scattering portion formed areas SN of the light guide member 19. Specifically, of the portions of the first reflection sheets 21 and the second reflection sheets 22 overlapping with the light guide member 19, an inside portion (on the side opposite to the side of the LEDs 17) overlaps with the light scattering portion formed area SA, whereas an outside portion (on the side of the LEDs 17) overlaps with the light scattering portion non-formed areas SN. This means that a part (inner end portion) of the first reflection sheets 21 and the second reflection sheets 22 overlaps with the dots 20a of the light scattering portion 20. Thus, the first reflection sheets 21 and the second reflection sheets 22 can reliably cause the light reflected within the light guide member 19 to reach the light scattering portion formed area SA in which the light scattering portion 20 is formed. The first reflection sheets 21 and the second reflection sheets 22 are disposed with their inner end portions on the side opposite to the side of the LEDs 17 aligned to be flush. The first reflection sheets 21 and the second reflection sheets 22 are made of the same material and have the same surface light reflectance.

As shown in FIGS. 3 and 4, the third reflection sheet 23 is attached to the surface 19c of the light guide member 19 opposite to the light output surface 19a in a most part excepting the end portions LE on the side of the LEDs 17, through an adhesive layer (not shown). The third reflection sheet 23 is configured to reflect the light traveling from the both end portions LE on the side of the LEDs 17 toward the central side in the light guide member 19 such that the light can be directed up toward the front side, that is the light output side. As shown in FIG. 7, the third reflection sheet 23 is disposed adjacent to the second reflection sheets 22 disposed in the end portions LE of the light guide member 19 on the side of the LEDs 17, with the end surfaces facing the reflection sheets 22 and 23 abutted against each other. Thus, formation of a gap between the reflection sheets 22 and 23 is prevented. Accordingly, the light in the light guide member 19 can be efficiently reflected by the reflection sheets 22 and 23 seamlessly. In FIG. 5, the boundary positions between the second reflection sheets 22 and the third reflection sheet 23 are indicated by broken lines.

As described above, the second reflection sheets 22 and the third reflection sheet 23 disposed along the surface 19c of the light guide member 19 on the side opposite to the light output surface 19a are separate components and made of different materials. Specifically, the third reflection sheet 23 has a relatively lower surface light reflectance compared to the light reflectance of the second reflection sheets 22. The third reflection sheet 23 occupies a most part of the light guide member 19 in terms of area and is far larger than the second reflection sheets 22. However, the third reflection sheet 23 is disposed farther from the LEDs 17 compared to the second reflection sheets 22. Thus, the third reflection sheet 23 has a lower importance than the second reflection sheets 22 from the viewpoint of light utilization efficiency. On the other hand, manufacturing cost of the reflection sheets 21 to 23 generally increases with increasing light reflectance and decreases with decreasing light reflectance. Therefore, by setting the light reflectance of the third reflection sheet 23 as described above, manufacturing cost can be effectively reduced without significantly compromising the light utilization efficiency. In contrast, the second reflection sheets 22 are disposed closer to the LEDs 17 compared to the third reflection sheet 23 and are therefore more important than the third reflection sheet 23 from the viewpoint of light utilization efficiency. However, the second reflection sheets 22 are much smaller in area than the third reflection sheet 23. Thus, by relatively increasing the light reflectance of the second reflection sheets 22 compared to the light reflectance of the third reflection sheet 23, high light utilization efficiency can be obtained without a significant increase in cost.

Next, the operation of the above structure according to the present embodiment will be described. When the liquid crystal display device 10 is manufactured, the liquid crystal panel 11, the backlight unit 12, the bezel 13, and others that have been separately manufactured may be assembled. In the following, a procedure for manufacturing the liquid crystal display device 10 will be described.

Figure 9:
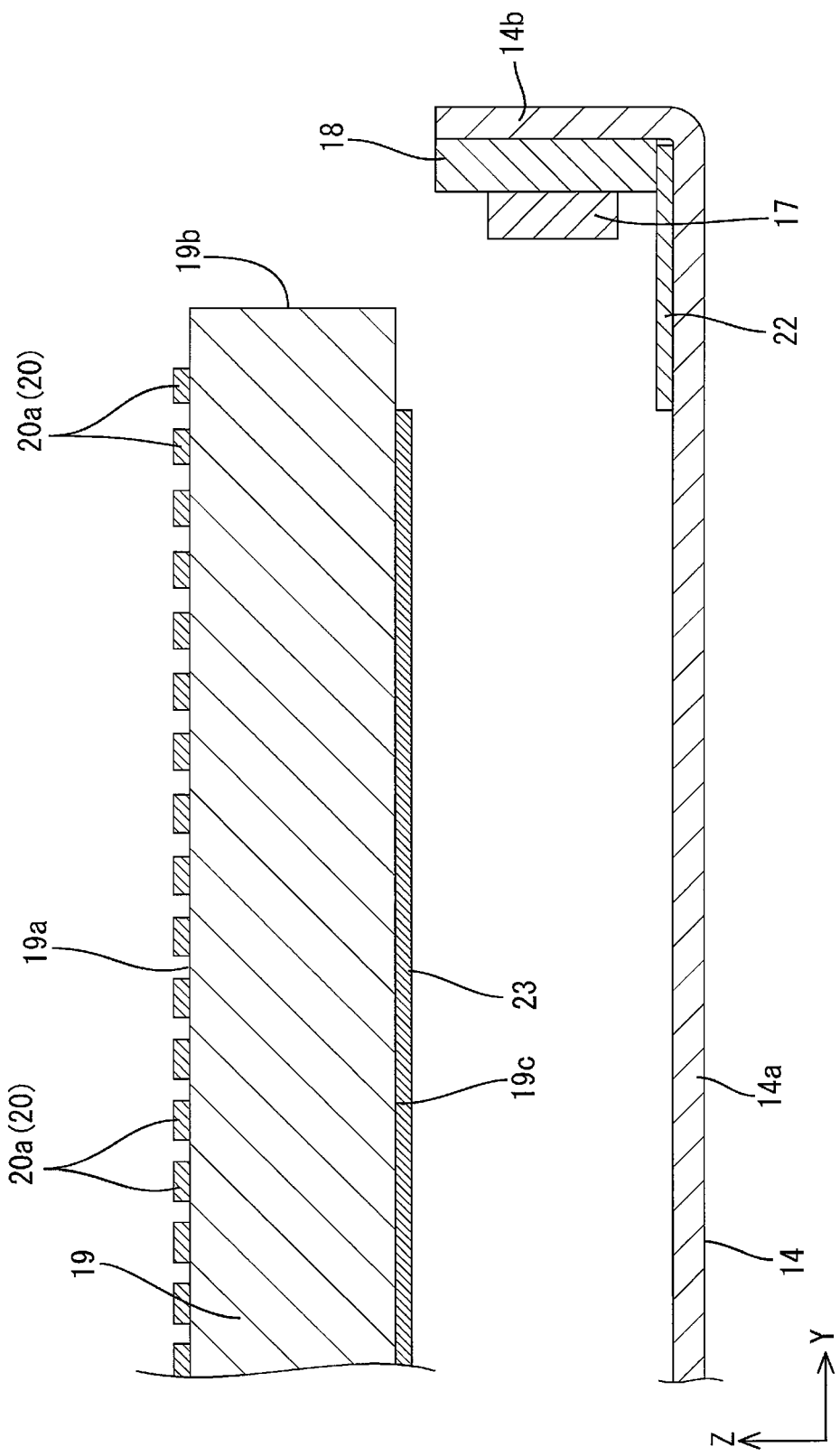
FIG. 9 is a cross section view taken along line vii-vii of FIG. 4, showing a state prior to attaching the light guide member to the chassis to which the second reflection sheet and the LED board have been attached.

First, the second reflection sheets 22 are attached to the both end portions of the bottom plate 14a of the chassis 14 on the long sides thereof. At this time, an adhesive layer which may include an adhesive agent is placed between the back side surfaces of the second reflection sheets 22 and the front side surfaces of the bottom plate 14a so as to place them in a fixed state. Then, as shown in FIG. 9, the LED boards 18 are attached to both of the side plates 14b of the chassis 14 on the long sides thereof, by using screws, for example. Separately, the light scattering portion 20 is formed on the light output surface 19a of the light guide member 19, and the third reflection sheet 23 is attached to the surface 19c on the back side of the light guide member 19 through an adhesive layer, thereby obtaining the state shown in FIG. 9.

Figure 10:
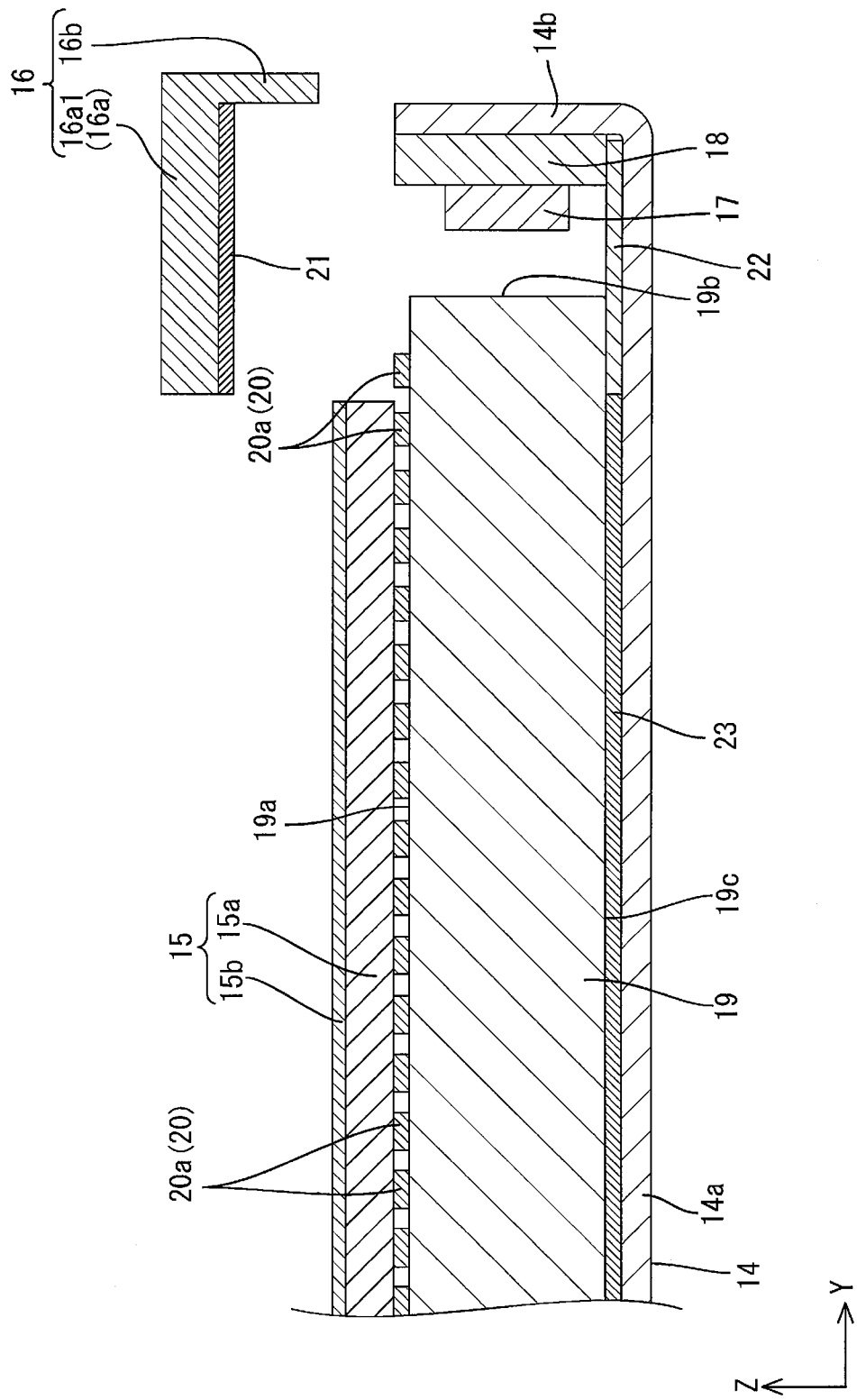
FIG. 10 is a cross section view taken along line vii-vii of FIG. 4, showing a state prior to attaching the pressing member to the chassis to which the second reflection sheet, the LED board, and the light guide member have been attached.

Next, the light guide member 19 integrated with the third reflection sheet 23 as described above is housed in the chassis 14. At this time, as shown in FIGS. 5 and 10, the light guide member 19 is disposed at a position sandwiched between the pair of LED boards 18 with respect to the Y-axis direction, and the both end surfaces of the third reflection sheet 23 extending along the X-axis direction are abutted against the inner end surfaces of the second reflection sheets 22 with substantially no gap therebetween. Then, the diffuser plate 15a and the optical sheets 15b are stacked on the light guide member 19 from the front side in order. Separately, the first reflection sheets 21 are attached to the back side surfaces of the both long side portions 16a1 of the base portion 16a of the pressing member 16 through adhesive layers, thereby obtaining the state shown in FIG. 10.

Thereafter, the pressing member 16 integrated with the first reflection sheets 21 as described above is attached to the chassis 14. At this time, the outer peripheral end portions of the light guide member 19 are pressed by the frame-shaped base portion 16a of the pressing member 16 from the front side along the entire circumference of the light guide member 19, with the side plates 14b of the chassis 14 surrounded from the outside by the side portions 16b. The pair of the first reflection sheets 21 attached to the long side portions 16a1 of the base portion 16a are abutted on the both end portions LE of the light guide member 16 on the side of the LEDs 17 and the LED boards 18 from the front side, as shown in FIG. 7. At this time, the both end portions LE of the light guide member 16 on the side of the LEDs 17 and the LED boards 18 are sandwiched between the second reflection sheets 22 on the back side and the first reflection sheets 21 on the front side, such that the space between the end portions LE and the LED boards 18 is optically closed by the reflection sheets 21 and 22. As shown in FIG. 8, the reflection sheets 21 and 22 are also disposed in the spaces between the LEDs 17 arranged parallel to each other in the X-axis direction. Therefore, those spaces can also be optically closed. Since the first reflection sheets 21 are formed in the areas across the light scattering portion non-formed areas SN and the light scattering portion formed area SA of the light guide member 19, the inner end portions of the first reflection sheets 21 are abutted on the end portions of the light scattering portion 20 from the front side. Further, the side portions 16b of the pressing member 16 are fixed onto the side plates 14b with screws or the like. Thus, the light guide member 19 is held on the chassis 14 by being pressed from the front side by the pressing member 16 through the first reflection sheets 21. Thereafter, the liquid crystal panel 11 is placed on the base portion 16a of the pressing member 16 from the front side and further the bezel 13 is attached, thereby obtaining the liquid crystal display device 10 shown in FIGS. 3 and 4.

When power supply to the liquid crystal display device 10 is turned on, driving of the liquid crystal panel 11 and the LEDs 17 of the backlight unit 12 are controlled by a control circuit which is not shown, whereby the liquid crystal panel 11 is irradiated with illumination light, and a predetermined image is displayed on the liquid crystal panel 11. In the following, the operation of the backlight unit 12 will be described in detail. When the LEDs 17 are turned on, the light emitted by the LEDs 17 is incident on the light incident surfaces 19b of the light guide member 19, as shown in FIG. 7. Although there is the predetermined space between the LEDs 17 and the light incident surfaces 19b, the space is optically closed by the first reflection sheets 21 on the front side and the second reflection sheets 22 on the back side. Thus, the light from the LEDs 17 is repeatedly reflected by the reflection sheets 21 and 22. Accordingly, the light can be efficiently made incident on the light incident surfaces 19b with almost no leakage to the outside. Even if there is a slight gap between the first reflection sheets 21 and the LED boards 18 or the side plates 14b of the chassis 14 due to dimensional tolerance or assembly error, the escaping light can be absorbed by the surface of the pressing member 16 having the light blocking property, thus preventing the leakage of light to the outside.

The light incident on the light incident surfaces 19b of the light guide member 19 travels in the end portions LE on the side of the LEDs 17 and is guided toward the central side of the light guide member 19 in the short side direction. Since the light from the LEDs 17 is first transmitted through the end portions LE of the light guide member 19 on the side of the LEDs 17, it is important to allow the light to travel in the end portions LE without loss, from the viewpoint of increasing brightness. If the end portions LE of the light guide member 19 on the side of the LEDs 17 are pressed by a pressing member directly, the light in the end portions LE may be absorbed by the pressing member, resulting in a loss of the traveling light. In this respect, according to the present embodiment, the first reflection sheets 21 are disposed between the end portions LE of the light guide member 19 on the side of the LEDs 17 and the pressing member 16, extending in the entire areas of the overlapping portions 16a1 of the pressing member 16 for the end portions LE. Thus, the light can be reflected by the first reflection sheets 21 and caused to efficiently travel in the end portions LE without being absorbed by the pressing member 16. Further, the first reflection sheets are formed in the areas across the light scattering portion non-formed areas SN and the light scattering portion formed area SA of the light guide member 19. Accordingly, the reflected light can be reliably caused to reach the light scattering portion formed area SA.

In addition, according to the present embodiment, the first reflection sheets 21 are fixed not to the light guide member 19 but to the pressing member 16. Similarly, the second reflection sheets 22 disposed on the side opposite to the first reflection sheets 21 are fixed not to the light guide member 19 but to the bottom plate 14a of the chassis 14. If an adhesive layer is disposed between the end portions LE of the light guide member 19 and the first reflection sheets 21, or between the end portions LE and the second reflection sheets 22, the light may be absorbed by the adhesive layer, resulting in a loss of the traveling light. In this respect, according to the present embodiment, no adhesive layer is disposed between the first reflection sheets 21 and the end portions LE of the light guide member 19 nor between the second reflection sheets 22 and the end portions LE of the light guide member 19. Thus, the light in the end portions LE can be directly reflected by the first reflection sheets 21 and the second reflection sheets 22. Therefore, the light can efficiently travel with substantially no loss. Accordingly, the light in the end portions LE of the light guide member 19 on the side of the LEDs 17 is repeatedly reflected between the pair of reflection sheets 21 and 22 sandwiching the end portions LE, thereby allowing the light to be efficiently guided toward the central side of the light guide member 19.

The light travels from the end portions LE of the light guide member 19 on the side of the LEDs 17 to the central side and, upon reaching the portions of the light output surface 19a where the light scattering portion 20 is not formed, the light is totally reflected therein and further reflected by the third reflection sheet 23 on the back side, thus being further guided toward the central side. On the other hand, the light hitting the light scattering portion 20 formed on the light output surface 19a is scattered by the light scattering portion 20, whereby most of the light is caused to be output through the light output surface 19a to the outside at incident angles smaller than the critical angle. As shown in FIGS. 5 and 7, the light scattering portion 20 has smaller degrees of light scattering at positions closer to the LEDs 17 where the amount of light in the light guide member 19 is greater, and greater degrees of light scattering at positions farther from the LEDs 17 where the amount of light in the light guide member 19 is smaller. Thus, the amount of light output from the light output surface 19a can be made uniform in the plane thereof. Accordingly, uneven brightness can be suppressed. Since the output light from the backlight unit 12 is even and uniform, excellent display quality can be obtained on the display surface of the liquid crystal display device 10.

As described above, the backlight unit 12 according to the present embodiment includes the LEDs 17 as the light source; the light guide member 19 having the end portions LE facing the LEDs 17 and guiding the light from the LEDs 17 to the light output side; the pressing member 16 configured to press the light guide member 19 from the light output side; and the pair of reflection sheets 21 and 22 sandwiching the end portions LE of the light guide member 19 on the side of the LEDs 17. The pair of reflection sheets 21 and 22 includes the first reflection sheets 21 disposed on the light output side with respect to the light guide member 19, and the second reflection sheets 22 disposed on the side opposite to the light output side. The first reflection sheets 21 are fixed onto the pressing member 16.

Since the end portions LE of the light guide member 19 on the side of the LEDs 17 are sandwiched by the pair of reflection sheets 21 and 22, the light that has entered the light guide member 19 from the LEDs 17 travels within the light guide member 19 while being reflected between the first reflection sheets 21 on the light output side and the second reflection sheets 22 on the side opposite to the first reflection sheets 21. The first reflection sheets 21 are disposed between the pressing member 16 and the light guide member 19. Thus, the light can be more efficiently reflected in the light guide member 19 compared to the configuration where the light guide member 19 is pressed by the pressing member 16 directly. Thus, the light utilization efficiency can be improved, and therefore higher brightness can be obtained. In addition, the first reflection sheets 21 are fixed onto the pressing member 16, and therefore, the light can be directly reflected by the first reflection sheets 21 without being absorbed by an adhesive layer or the like. Thus, higher light utilization efficiency and brightness can be obtained compared to the configuration where the first reflection sheets 21 are fixed onto the light guide member 19 through an adhesive layer or the like.

The first reflection sheets 21 are disposed on the entire areas of the overlapping portions 16a1 of the pressing member 16 for the end portions LE of the light guide member 19 on the side of the LEDs 17. Thus, the overlapping portions 16a1 of the pressing member 16 can be prevented from directly facing the end portions LE of the light guide member 19 on the side of the LEDs 17. In this way, the light in the end portions LE can be prevented from hitting the overlapping portions 16a1 and being absorbed thereby. Accordingly, the light utilization efficiency can further be improved.

The pair of reflection sheets 21 and 22 is disposed so as to sandwich the LEDs 17 in addition to the end portions LE of the light guide member 19 on the side of the LEDs 17. In this way, the light from the LEDs 17 can be efficiently reflected by the pair of reflection sheets 21 and 22 sandwiching the LEDs 17 in addition to the end portions LE of the light guide member 19 on the side of the LEDs 17, while the light is caused to be incident on the light guide member 19. Thus, the light utilization efficiency and brightness can further be increased.

A plurality of the LEDs 17 is disposed intermittently and parallel to each other along the end portions LE of the light guide member 19 on the side of the LEDs 17, with the pair of reflection sheets 21 and 22 extending along the arrangement direction of the LEDs 17 while sandwiching the plurality of LEDs 17 at once. In this way, the pair of reflection sheets 21 and 22 is disposed even between the adjacent LEDs 17. Therefore, the light existing between the adjacent LEDs 17 can also be efficiently reflected by the pair of reflection sheets 21 and 22 and thereby utilized as output light. Thus, the light utilization efficiency can further be improved. Further, better workability in installing the pair of reflection sheets 21 and 22 can be obtained compared to the configuration where the reflection sheets are disposed for the LEDs 17 individually.

The lighting device may further include the chassis 14. The chassis 14 houses the light guide member 19 and the LEDs 17 and has an opening opened to the light output side. In this configuration, the second reflection sheets 22 are fixed onto the chassis 14. Since the second reflection sheets 22 are fixed onto the chassis 14, the light can be directly reflected by the second reflection sheets 22 without being absorbed by an adhesive layer or the like. Thus, the light utilization efficiency and brightness can further be increased compared to the configuration where the second reflection sheets 22 are fixed onto the light guide member 19 through an adhesive layer or the like.

On the light output surface 19a of the light guide member 19 on the light output side, the light scattering portion 20 scattering light is provided. In this way, the light in the light guide member 19 can be scattered by the light scattering portion 20. Therefore, the output of the light from the light output side can be facilitated.

The end sides of the light guide member 19 closer to the LEDs 17 constitute the light scattering portion non-formed areas SN in which the light scattering portion 20 is not formed, whereas the central side of the light guide member 19 except for the light scattering portion non-formed areas SN constitutes the light scattering portion formed area SA in which the light scattering portion 20 is formed. The pair of reflection sheets 21 and 22 is disposed in the areas straddling the light scattering portion non-formed areas SN and the light scattering portion formed area SA. Since the pair of reflection sheets 21 and 22 is disposed in the areas straddling the light scattering portion non-formed areas SN, in which the light scattering portion 20 is not formed, and the light scattering portion formed area SA, in which the light scattering portion 20 is formed, the light reflected by the pair of reflection sheets 21 and 22 can be reliably caused to reach the light scattering portion formed area SA. In the light scattering portion formed area SA, the output of the light is facilitated by the light scattering portion 20. Therefore, the light utilization efficiency can further be increased.

In the light scattering portion 20, the light scattering degree is increased in a direction away from the LEDs 17. In portions of the light guide member 19 relatively close to the LEDs 17, the amount of internal light is relatively large, whereas in portions relatively farther from the LEDs 17, the amount of internal light is relatively small. On the other hand, the light output is more facilitated as the light scattering degree of the light scattering portion 20 is increased, whereas the light output is more suppressed as the light scattering degree is decreased. Thus, by varying the light scattering degree of the light scattering portion 20 in proportion to the distance from the LEDs 17, the light output can be suppressed in the portions of the light guide member 19 with greater amounts of internal light, whereas the light output can be facilitated in the portions with smaller amounts of internal light. Thus, a uniform in-plane distribution of the output light through the surface of the light guide member 19 on the light output side can be obtained.

The pair of reflection sheets 21 and 22 is disposed such that their end portions opposite to the side of the LEDs 17 are flush. In this way, the light can be more efficiently reflected between the pair of reflection sheets 21 and 22 compared to the configuration where the end portions opposite to the side of the LEDs 17 are staggered.

The pair of reflection sheets 21 and 22 has the substantially same surface light reflectance. In this way, the light utilization efficiency can further be increased.

The pair of reflection sheets 21 and 22 is made of the same material. In this way, the manufacturing cost for the pair of reflection sheets 21 and 22 can be reduced.

On the surface 19c of the light guide member 19 on the side opposite to the light output side, the third reflection sheet 23 is disposed at least in an area excluding the end portions LE on the side of the LEDs 17 in which the second reflection sheets 22 are disposed. In this way, the light in the light guide member 19 can be reflected by the third reflection sheet 23 such that the light can be caused to be directed up toward the light output side. By providing the second reflection sheets 22 and the third reflection sheet 23 as separate components, the material for the respective reflection members, for example, can be appropriately selected.

The second reflection sheets 22 have a higher surface light reflectance than the third reflection sheet 23. The second reflection sheets 22 are disposed closer to the LEDs 17 than the third reflection sheet 23 is, i.e., at a position with a relatively large amount of light. Thus, by relatively increasing the surface light reflectance of the second reflection sheets 22, the light utilization efficiency can further be increased. In contrast, the third reflection sheet 23 is disposed in a most part of the light guide member 19 except for the end portions LE on the side of the LEDs 17. Thus, by relatively lowering the surface light reflectance of the third reflection sheet 23, the manufacturing cost for the third reflection sheet 23 can be significantly reduced. Since the third reflection sheet 23 is disposed farther from the LEDs 17 than the second reflection sheets 22 are, i.e., at a position with a relatively small amount of light, the influence of relatively lowering the surface light reflectance on the light utilization efficiency is minor.

The second reflection sheets 22 and the third reflection sheet 23 are disposed with their adjacent end surfaces abutted against each other. In this way, generation of a gap between the second reflection sheets 22 and the third reflection sheet 23 can be avoided. Thus, light can be reflected by the second reflection sheets 22 and the third reflection sheet 23 without leaking. Therefore, high light utilization efficiency can be achieved.

The pressing member 16 has a light blocking property at least on a surface thereof. In this way, even when there is leakage of light from the LEDs 17 toward the pressing member 16 due to the influence of dimensional tolerance or the like, the leaking light can be blocked by the pressing member 16, thus preventing the leakage of light from the pressing member 16 to the outside.

The pressing member 16 has a frame shape surrounding the end portions of the light guide member 19 along its entire circumference. In this way, leakage of light from the pressing member 16 to the outside can be more reliably prevented.

A pair of the LEDs 17 is disposed so as to face the end portions LE of the light guide member 19. In this way, the light from the pair of LEDs 17 can be made incident on the end portions LE of the light guide member 19. Therefore, a uniform in-plane distribution of output light from the surface of the light guide member 19 on the light output side can be obtained.

The light source is the LEDs 17. In this way, high brightness and low power consumption can be achieved. A plurality of the LEDs 17 is disposed parallel to each other on the LED boards 18 extending along the end portions LE of the light guide member 19. In this way, the plurality of LEDs 17 can be installed parallel to each other with excellent workability.

The first embodiment of the present invention has been described above. However, the present invention is not limited to the foregoing embodiment and may include the following modifications. In the following modifications, members similar to those according to the foregoing embodiment will be designated with similar signs and their illustration in the drawings and description will be omitted.

<First Modification of the First Embodiment>

A first modification of the first embodiment will be described with reference to FIG. 11. According to the first modification, modified first reflection sheets 21-1 will be described.

Figure 11:
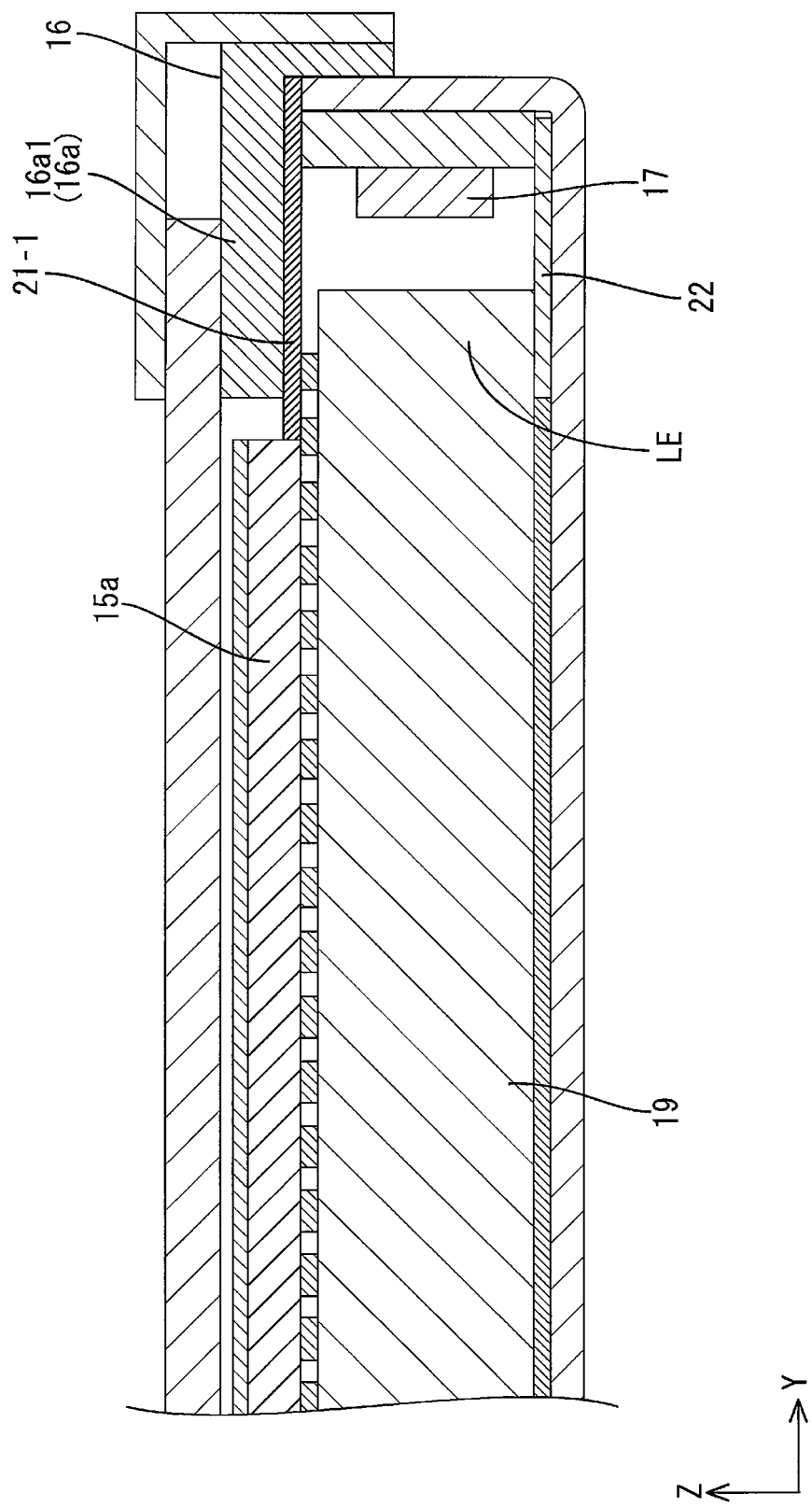
FIG. 11 is a cross section view of an end portion of the liquid crystal display device according to a first modification of the first embodiment.

As shown in FIG. 11, the first reflection sheets 21-1 according to the present modification have a size such that they protrude inward beyond the overlapping portions 16a1 of the base portion 16a of the pressing member 16 for the end portions LE of the light guide member 19 on the side of the LEDs 17, i.e., in a direction away from the LEDs 17. The first reflection sheets 21-1 have their inner end surfaces (surface opposite to the side of the LEDs 17) abutted against the side end surfaces of the diffuser plate 15a with substantially no gap, thereby preventing the leakage of light between the first reflection sheets 21-1 and the diffuser plate 15a. The inner end surfaces of the first reflection sheets 21-1 are disposed more inside than the inner end surfaces of the second reflection sheets 22. Thus, the light in the light guide member 19 can be more reliably prevented from being absorbed by the pressing member 16.

<Second Modification of the First Embodiment>

The second modification of the first embodiment will be described with reference to FIG. 12. According to the second modification, an integral type reflection sheet 24 is used, which integrates the second reflection sheets 22 and the third reflection sheet 23 of the first embodiment.

Figure 12:
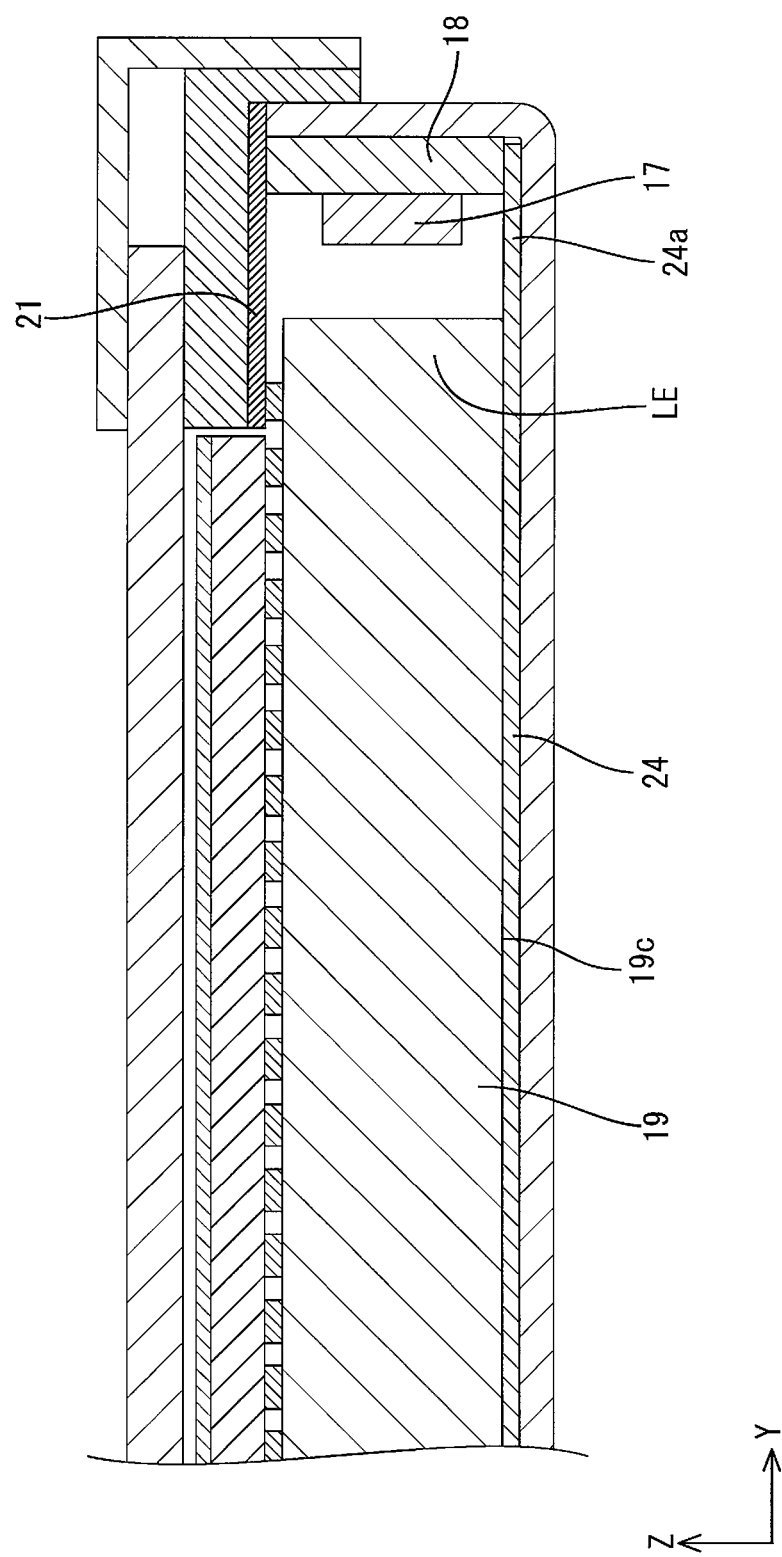
FIG. 12 is a cross section view of the end portion of the liquid crystal display device according to a second modification of the first embodiment.

As shown in FIG. 12, the integral type reflection sheet 24 according to the present modification is formed to be larger than the light guide member 19 in the short side dimension (dimension in the Y-axis direction), and fixed onto the surface 19c of the light guide member 19 on the back side. Specifically, the integral type reflection sheet 24 covers the entire surface 19c of the light guide member 19 on the back side, and includes laterally protruding portions 24a sandwiching the LED boards 18 with the first reflection sheets 21. The integral type reflection sheet 24 also sandwiches the end portions LE of the light guide member 19 on the side of the LEDs 17 with the first reflection sheets 21. In this structure, the number of components can be reduced and therefore the manufacturing cost, for example, can be reduced.

<Second Embodiment>

Next, a second embodiment of the present invention will be described with reference to FIG. 13. According to the second embodiment, a light scattering portion 120 is formed at a modified location. Redundant description of structures, operations, or effects similar to those of the first embodiment will be omitted.

Figure 13:
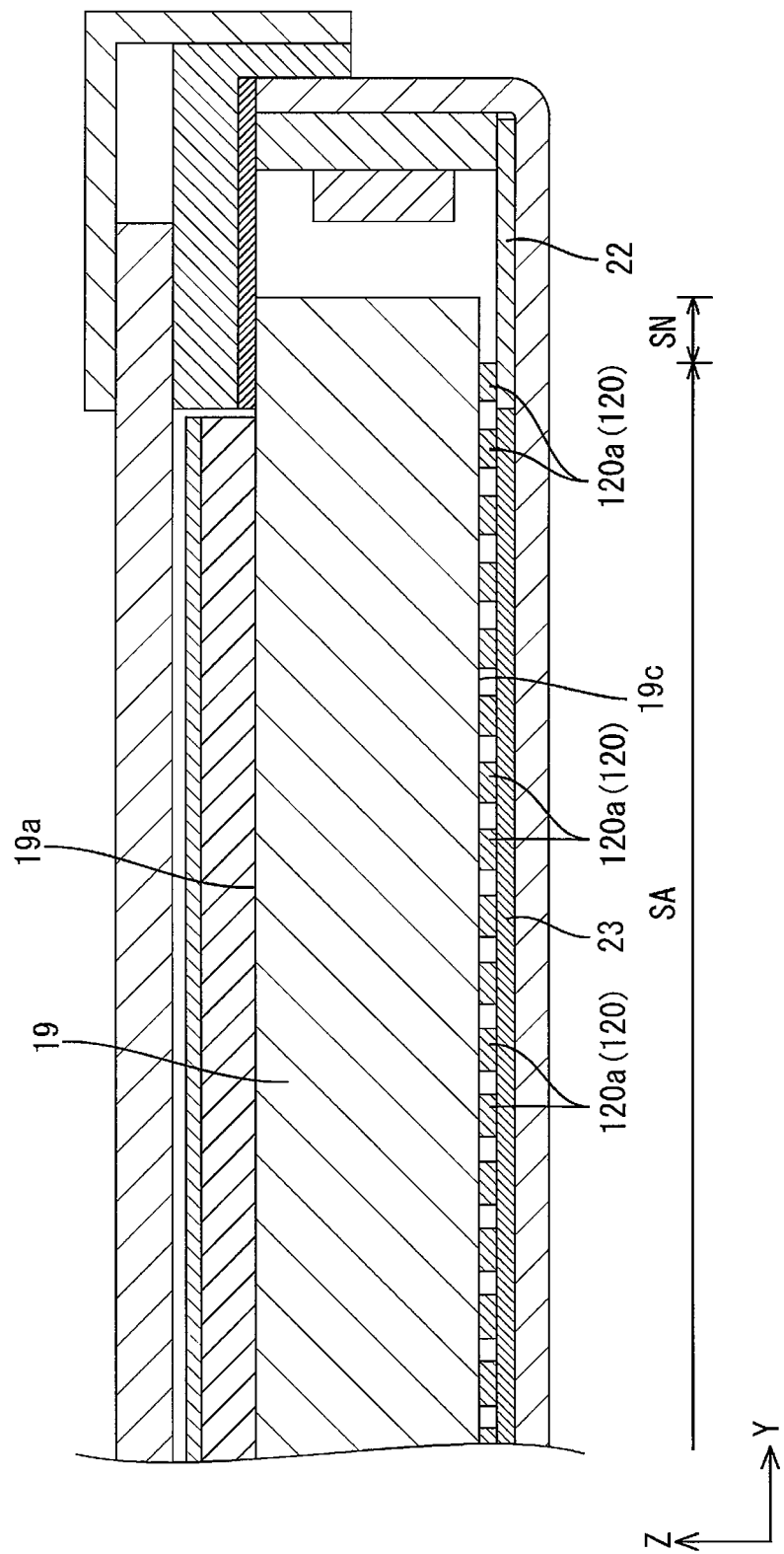
FIG. 13 is a cross section view of the end portion of the liquid crystal display device according to a second embodiment of the present invention.

As shown in FIG. 13, the light scattering portion 120 is formed on the back side of a light guide member 19, that is, on a surface 19c opposite to a light output surface 19a. A third reflection sheet 23 is attached to the surface 19c of the light guide member 19 on the back side through the light scattering portion 120. Second reflection sheets 22 are disposed in the areas across the light scattering portion non-formed areas SN and the light scattering portion formed area SA of the light guide member 19. Therefore, the light scattering portion 120 is provided between the second reflection sheets 22 and the light guide member 19. The distribution of dots 120a constituting the light scattering portion 120 with respect to the Y-axis direction is the same as that according to the first embodiment, and therefore redundant descriptions will be omitted.

Some of the light in the light guide member 19 that hits the light scattering portion 120 on the surface 19c on the back side is scattered therein and is further reflected by the second reflection sheets 22 or the third reflection sheet 23 and caused to be output through the light output surface 19a as is. On the other hand, light that reaches the portions of the surface 19c of the light guide member 19 on the back side where the light scattering portion 120 is not formed is reflected by the second reflection sheets 22 or the third reflection sheet 23 and caused to reach the light output surface 19a. However, the light is further totally reflected by the light output surface 19a and caused to travel again in the light guide member 19, eventually hitting the light scattering portion 120 and contributing to the output light.

<Other Embodiments>

The present invention is not limited to any of the foregoing embodiments described with reference to the drawings and may include the following embodiments in its technical scope.

(1) According to the first modification of the first embodiment, the first reflection sheets protrude inside beyond the overlapping portions of the pressing member for the end portions of the light guide member on the side of the LED. Conversely, the first reflection sheets may be located more inside than the overlapping portions of the pressing member such that the first reflection sheets only partially cover the overlapping portions. Such configuration is also included in the present invention.

(2) According to the second modification of the first embodiment, the integral type reflection sheet is fixed onto the light guide member. However, the integral type reflection sheet may be fixed onto the bottom plate of the chassis and not onto the light guide member.

(3) According to the foregoing embodiments, the first reflection sheets and the second reflection sheets are disposed so as to sandwich not only the end portions of the light guide member on the side of the LEDs but also the LED boards (LED). However, one or both of the first reflection sheets and the second reflection sheets may have a size such that they do not overlap with the LED boards (LED), and such configuration is also included in the present invention. When the size of the first reflection sheets is changed as described above, the first reflection sheets may partially cover the overlapping portions of the pressing member for the end portions of the light guide member on the side of the LEDs. Such configuration is also included in the present invention.

(4) According to the foregoing embodiments, a pair of the LED boards (LED) is disposed at the end portions of the chassis on the long sides thereof. However, a pair of the LED boards (LED) may be disposed at the end portions of the chassis on the short sides thereof, and such configuration is also included in the present invention. In this case, the first reflection sheets and the second reflection sheets may be disposed so as to sandwich the end portions of the light guide member on the short sides thereof.

(5) Apart from the configuration (4), one pair of the LED boards (LED) may be disposed at the end portions of the chassis on the long sides and another pair may be disposed at the end portions on the short sides. Conversely, a single LED board (LED) may be disposed at only one of the end portions of the chassis on the long sides or the short sides thereof, and such configuration is also included in the present invention. In this case, the arrangement or the number of the first reflection sheets and the second reflection sheets to be installed may be modified depending on the arrangement or the number of the LED boards (LED) to be installed.

(6) According to the foregoing embodiments, the first reflection sheets extend along the long side portions of the base portion of the pressing member. However, the first reflection sheets may have a frame shape (picture frame shape) extending along the entire base portion of the pressing member, and such configuration is also included in the present invention. In this way, the number of components of the first reflection sheets can be reduced, and the pressing member can be attached with excellent workability.

(7) According to the foregoing embodiments, the second reflection sheets are fixed onto the bottom plate of the chassis. However, the second reflection sheets may be fixed onto the light guide member, and such configuration is also included in the present invention.

(8) According to the foregoing embodiments, the first reflection sheets and the second reflection sheets are disposed in the areas straddling the light scattering portion non-formed areas and the light scattering portion formed area of the light guide member. However, one or both of the first reflection sheets and the second reflection sheets may have a size such that they overlap with only the light scattering portion non-formed areas of the light guide member and not with the light scattering portion formed area, and such configuration is also included in the present invention.

(9) According to the foregoing embodiments, the first reflection sheets and the second reflection sheets are made of the same material. However, the first reflection sheets and the second reflection sheets may be made of different materials. In this case, the first reflection sheets and the second reflection sheets may have different surface light reflectance.

(10) According to the foregoing embodiments, the second reflection sheets have a surface light reflectance higher than a surface light reflectance of the third reflection sheet. However, the second reflection sheets and the third reflection sheet may have substantially the same surface light reflectance. Conversely, the second reflection sheets may have a surface light reflectance lower than the surface light reflectance of the third reflection sheet. The second reflection sheets and the third reflection sheet may be made of the same material.

(11) According to the foregoing embodiments, the end surfaces of the second reflection sheets and the third reflection sheet are abutted against each other with substantially no gap. However, the second reflection sheets and the third reflection sheet may have a gap between their end surfaces, and such configuration is also included in the present invention.

(12) According to the foregoing embodiments, the pressing member has a black surface. However, the pressing member may have a color other than black.

(13) According to the foregoing embodiments, the pressing member has a frame shape (picture frame shape) surrounding the end portions of the light guide member along the entire circumference thereof. However, the pressing member may have other forms such as a linear shape extending along the LED boards (the end portions of the light guide member on the side of the LEDs), and such configuration is also included in the present invention.

(14) According to the foregoing embodiments, the light scattering portion is formed on the light output surface of the light guide member or on the surface thereof opposite to the light output surface. However, the light scattering portion may be formed on both the light output surface and the surface opposite to the light output surface of the light guide member, and such configuration is also included in the present invention.

(15) According to the foregoing embodiments, the light scattering portion is provided by dots of light scattering particles printed on the light guide member. However, the light scattering portion may be provided by a coarse surface formed on the light guide member by blasting. Further, the light scattering portion may be provided by forming fine grooves (concavities and convexities) during a resin molding of the light guide member.

(16) According to the foregoing embodiments, the light scattering portion is integrally formed on the light guide member by printing. However, the light scattering portion may be printed on a film as a separate component from the light guide member, and the film may then be affixed to the light guide member.

(17) According to the foregoing embodiments, the LED includes an LED chip that emits light of the single color of blue. However, the LED may include an LED chip that emits light of a single color of violet. Further, the LED may include three types of LED chips that emit light of the single colors of R, G, and B, respectively.

(18) According to the foregoing embodiments, the LED is surface-mounted on the LED board. However, the LED may be disposed on a film-type board.

(19) According to the foregoing embodiments, the light source is an LED. However, other types of light source, such as a cold cathode tube or an organic EL, may be used.

(20) In the foregoing embodiments, the liquid crystal panel is disposed in an upright manner with the short side directions aligned with the vertical direction. However, the liquid crystal panel may be disposed in an upright manner with the long side directions aligned with the vertical direction, and such configuration is also included in the present invention.

(21) In the foregoing embodiments, the switching component of the liquid crystal display device is TFTs. However, switching components other than TFTs (such as thin-film diodes (TFD)) may be used in the liquid crystal display device. The liquid crystal display device may be configured to provide a monochrome display as well as a color display.

(22) In the foregoing embodiments, the liquid crystal display device includes the liquid crystal panel as a display panel. However, the display device may include other type of display panel.

(23) In the foregoing embodiments, the television receiver includes a tuner. However, the display device may not include a tuner.

EXPLANATION OF SYMBOLS

10: Liquid crystal display device (Display device)
11: Liquid crystal panel (Display panel)
12: Backlight unit (Lighting device)
14: Chassis
16: Pressing member
16a1: Overlapping portion
17: LED (light source)
18: LED board
19: Light guide member
19a: Light output surface (surface on the light output side)
19c: Surface (surface opposite to the light output side)
20, 120: Light scattering portion
21: First reflection sheet (first reflection member)
22: Second reflection sheet (second reflection member)
23: Third reflection sheet (third reflection member)
LE: End portion (end portion of the light guide member on the light source side)
SA: Light scattering portion formed area
SN: Light scattering portion non-formed area
TV: Television receiver

The invention claimed is:
1. A lighting device, comprising:
a light source;
a light guide member including an end portion facing the light source and configured to guide light from the light source to a light output side;
a pressing member configured to press the light guide member from the light output side;
a pair of reflection members disposed so as to sandwich the end portion of the light guide member that faces the light source; and
a light scattering portion configured to scatter light and disposed on at least one of a surface of the light guide member on the light output side and a surface of the light guide member on a side opposite to the light output side; wherein
the pair of reflection members includes a first reflection member disposed on the light output side with respect to the light guide member and a second reflection member disposed on a side opposite to the light output side with respect to the light guide member;
the first reflection member is fixed to the pressing member;
the light guide member includes an end side portion close to the light source, and the end side portion corresponds to a light scattering portion non-formed area in which no light scattering portion is formed;
the light guide member includes a middle portion other than the light scattering portion non-formed area, the middle portion corresponds to a light scattering portion formed area in which the light scattering portion is formed; and
the pair of reflection members is disposed in an area ranging from the light scattering portion non-formed area to the light scattering portion formed area.

2. A lighting device, comprising:
a light source;
a light guide member including an end portion facing the light source and configured to guide light from the light source to a light output side;
a pressing member configured to press the light guide member from the light output side;
a pair of reflection members disposed so as to sandwich the end portion of the light guide member that faces the light source; and
a light scattering portion configured to scatter light and disposed on at least one of a surface of the light guide member on the light output side and a surface of the light guide member on a side opposite to the light output side; wherein
the pair of reflection members includes a first reflection member disposed on the light output side with respect to the light guide member and a second reflection member disposed on a side opposite to the light output side with respect to the light guide member;
the first reflection member is fixed to the pressing member; and
the light scattering portion has a light scattering degree increasing in a direction away from the light source.

3. The lighting device according to claim 2, wherein the first reflection member is disposed in an entire area of a portion of the pressing member overlapping with the end portion of the light guide member on the light source side.

4. The lighting device according to claim 2, wherein the pair of reflection members is disposed so as to sandwich the light source in addition to the end portion of the light guide member on the light source side.

5. The lighting device according to claim 4, wherein:
the light source includes a plurality of light sources that is arranged intermittently along the end portion of the light guide member that faces the light source; and
the pair of reflection members extends along an arrangement direction of the light sources so as to collectively sandwich the plurality of light sources.

6. The lighting device according to claim 2, further comprising a chassis having an opening opened to the light output side and configured to house the light guide member and the light source, wherein the second reflection member is fixed to the chassis.

7. The lighting device according to claim 2, further comprising a light scattering portion configured to scatter light and disposed on at least one of a surface of the light guide member on the light output side and a surface of the light guide member on a side opposite to the light output side.

8. The lighting device according to claim 2, wherein the pair of reflection members has substantially same surface light reflectance.

9. The lighting device according to claim 8, wherein the pair of reflection members is made of a same material.

10. The lighting device according to claim 2, wherein the pressing member has a light blocking property at least on a surface thereof.

11. The lighting device according to claim 10, wherein the pressing member has a frame shape surrounding the end portion of the light guide member along an entire circumference of the light guide member.

12. The lighting device according to claim 2, wherein the light source includes a pair of light sources and each of the light sources is disposed at each end portion of the light guide member so as to face the corresponding end portion.

13. The lighting device according to claim 2, wherein the light source is an LED.

14. The lighting device according to claim 13, further comprising an LED board extending along the end portion of the light guide member, wherein the LED includes a plurality of LEDs and the LEDs are disposed on the LED board along an extending direction of the LED board.

15. A display device comprising:
the lighting device according to claim 2; and
a display panel configured to display by using light from the lighting device.

16. The display device according to claim 15, wherein the display panel is a liquid crystal panel having liquid crystal contained between a pair of substrates.

17. A television receiver comprising the display device according to claim 15.

18. A light device, comprising:
a light source;
a light guide member including an end portion facing the light source and configured to guide light from the light source to a light output side;
a pressing member configured to press the light guide member from the light output side;
a pair of reflection members disposed so as to sandwich the end portion of the light guide member that faces the light source; wherein
the pair of reflection members includes a first reflection member disposed on the light output side with respect to the light guide member and a second reflection member disposed on a side opposite to the light output side with respect to the light guide member;
the first reflection member is fixed to the pressing member; and
the pair of reflection members is disposed with their end portions on a side opposite to the light source side aligned to be flush.

19. A lighting device, comprising:
a light source;
a light guide member including an end portion facing the light source and configured to guide light from the light source to a light output side;
a pressing member configured to press the light guide member from the light output side;
a pair of reflection members disposed so as to sandwich the end portion of the light guide member that faces the light source, wherein the pair of reflection members includes a first reflection member disposed on the light output side with respect to the light guide member and a second reflection member disposed on a side opposite to the light output side with respect to the light guide member; and
a third reflection member disposed on at least a portion of the surface of the light guide member that is opposite to the light output side, and the at least the portion of the surface is an area except for the end portion on the light source side where the second reflection member is provided; wherein
the first reflection member is fixed to the pressing member.

20. The lighting device according to claim 19, wherein the second reflection member has a higher surface light reflectance than the third reflection member.

21. The lighting device according to claim 19, wherein the second reflection member and the third reflection member are disposed with their adjacent end surfaces abutted against each other.

* * * * *